April 20, 1937.　　　H. C. LOCKWOOD　　　2,078,006

APPARATUS FOR WELDING

Filed Nov. 20, 1934　　　9 Sheets-Sheet 1

INVENTOR
HENRY C. LOCKWOOD
BY
ATTORNEY

April 20, 1937.  H. C. LOCKWOOD  2,078,006
APPARATUS FOR WELDING
Filed Nov. 20, 1934  9 Sheets-Sheet 2

INVENTOR
HENRY C. LOCKWOOD
BY
ATTORNEY

April 20, 1937. H. C. LOCKWOOD 2,078,006
APPARATUS FOR WELDING
Filed Nov. 20, 1934 9 Sheets-Sheet 3

INVENTOR
HENRY C. LOCKWOOD
BY
ATTORNEY

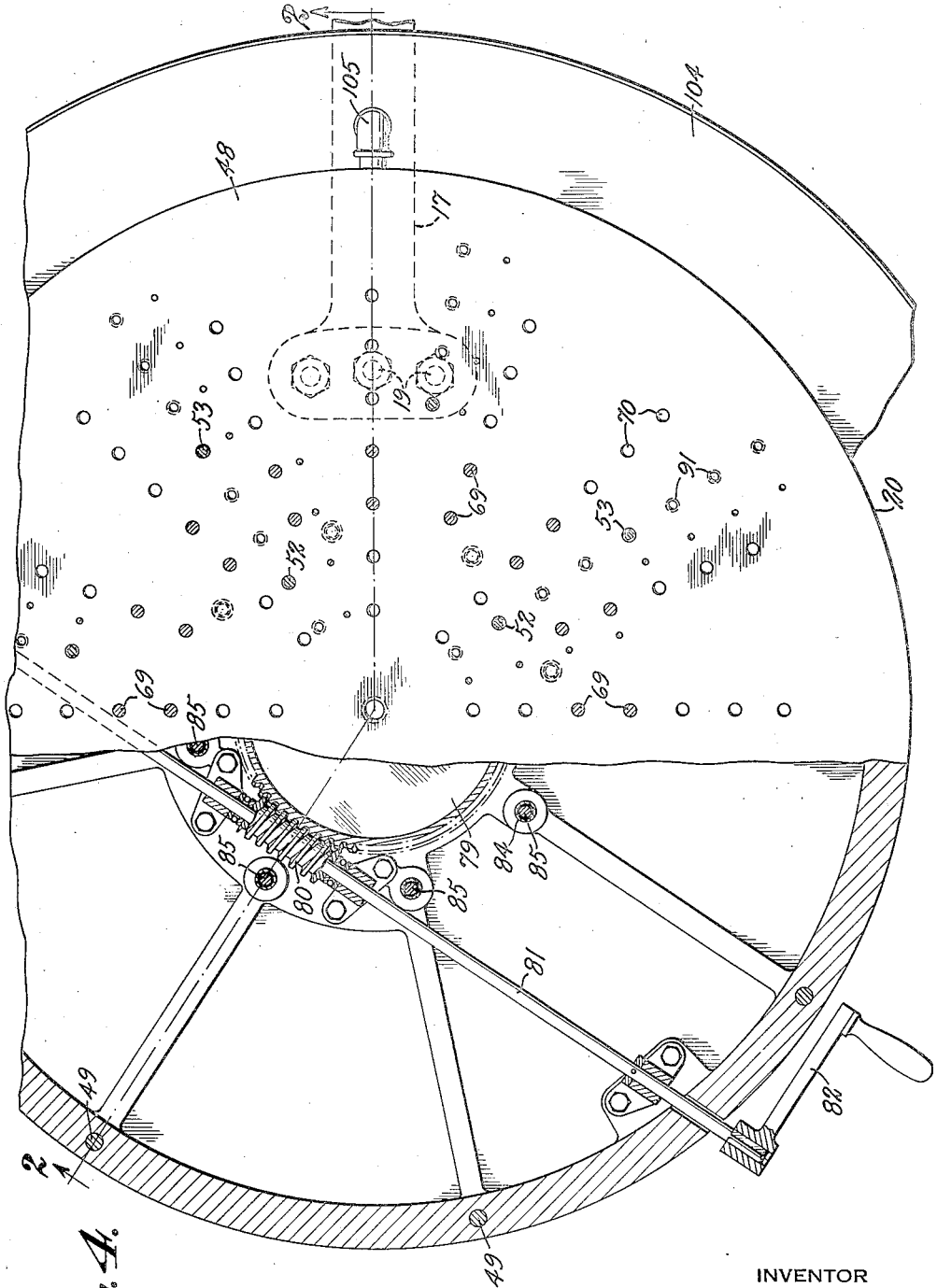

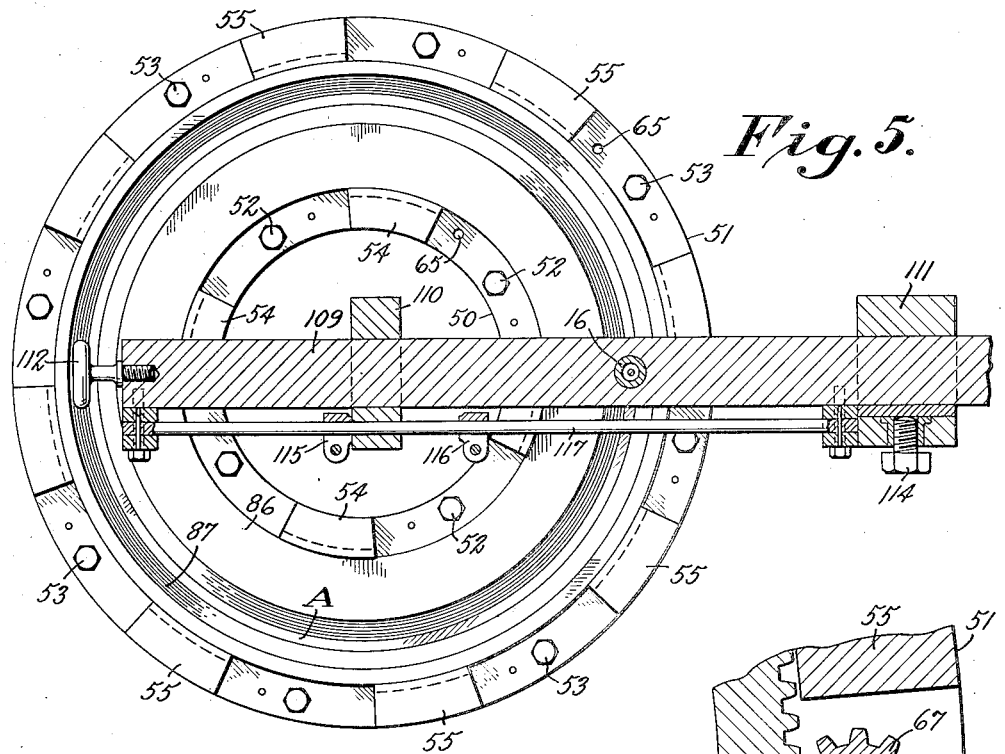
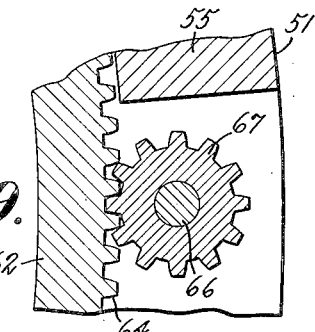
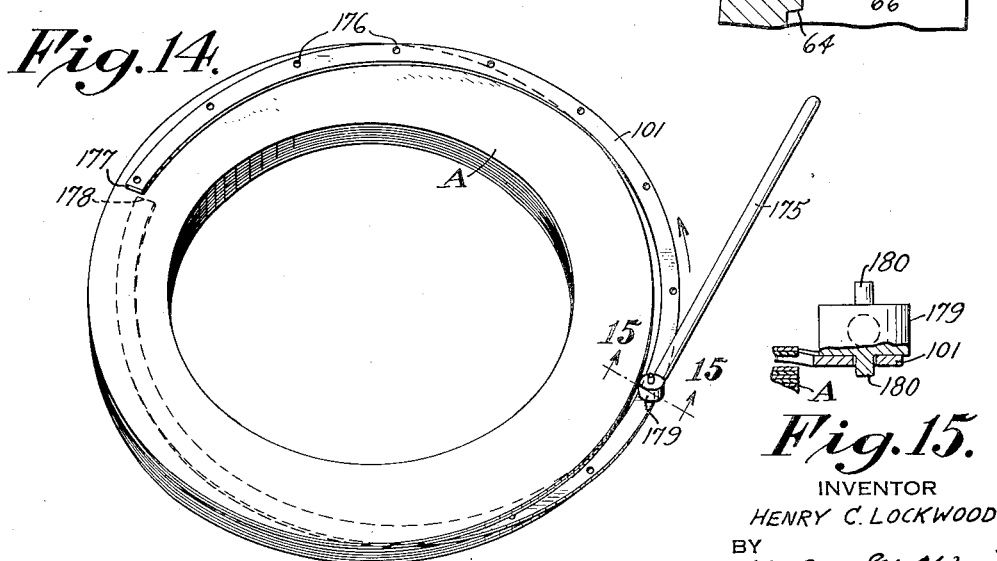

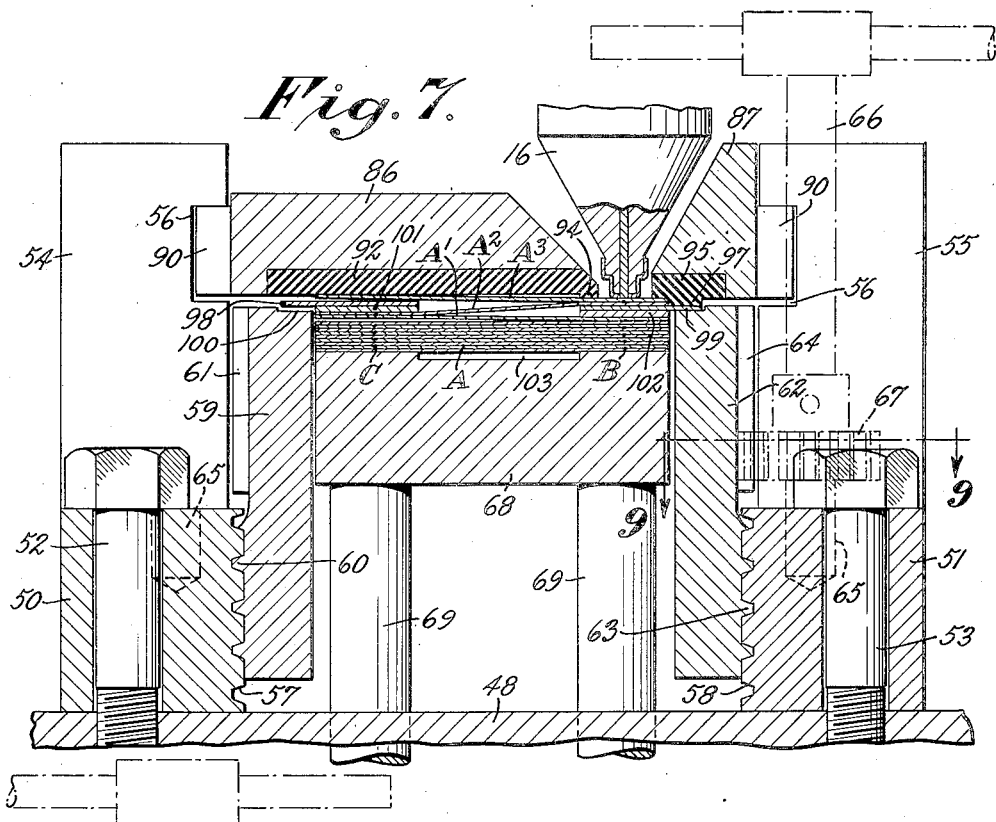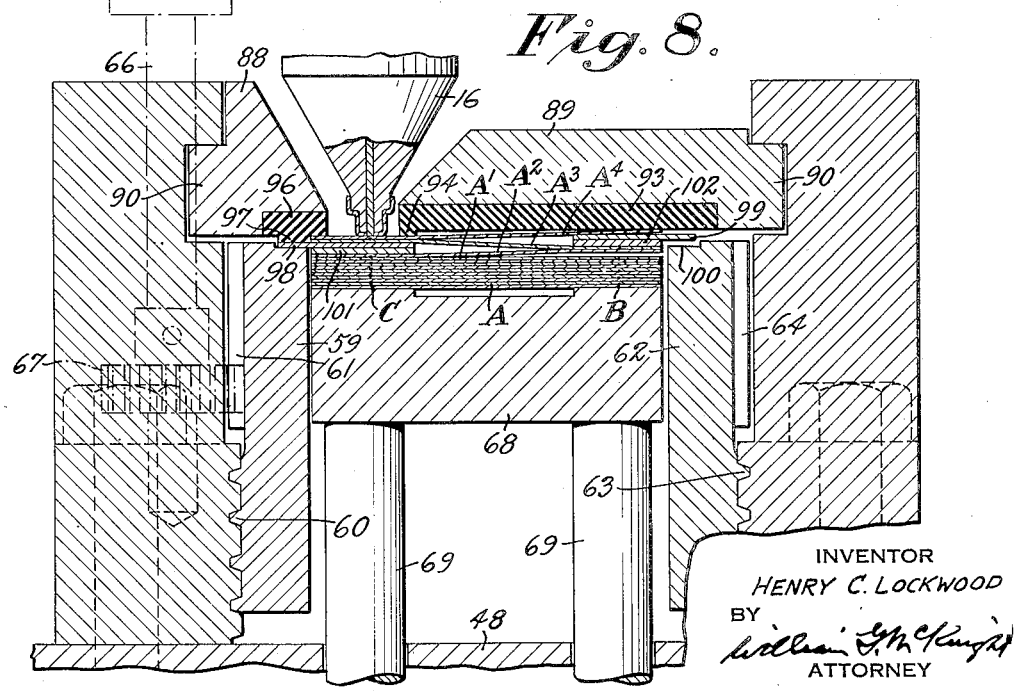

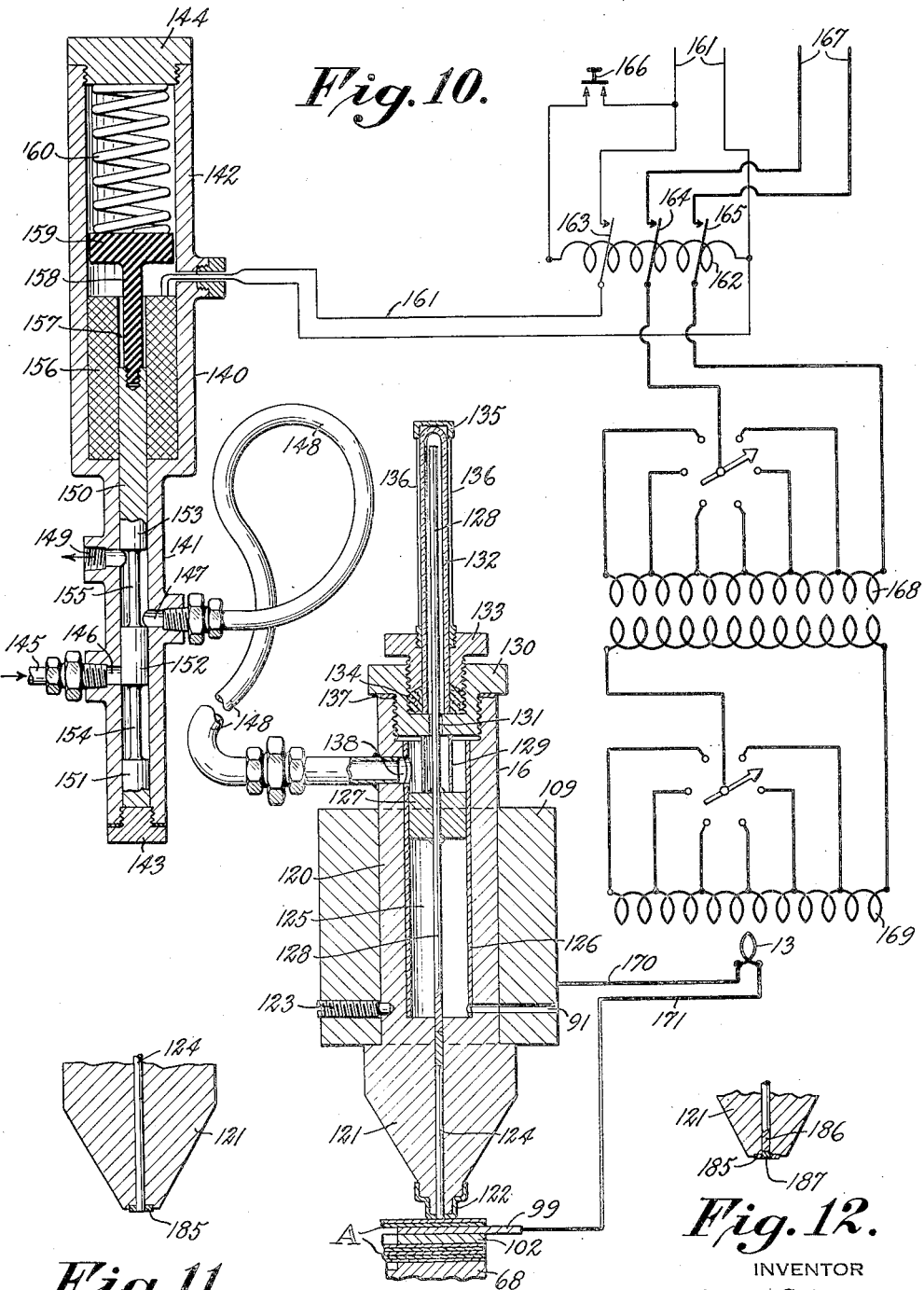

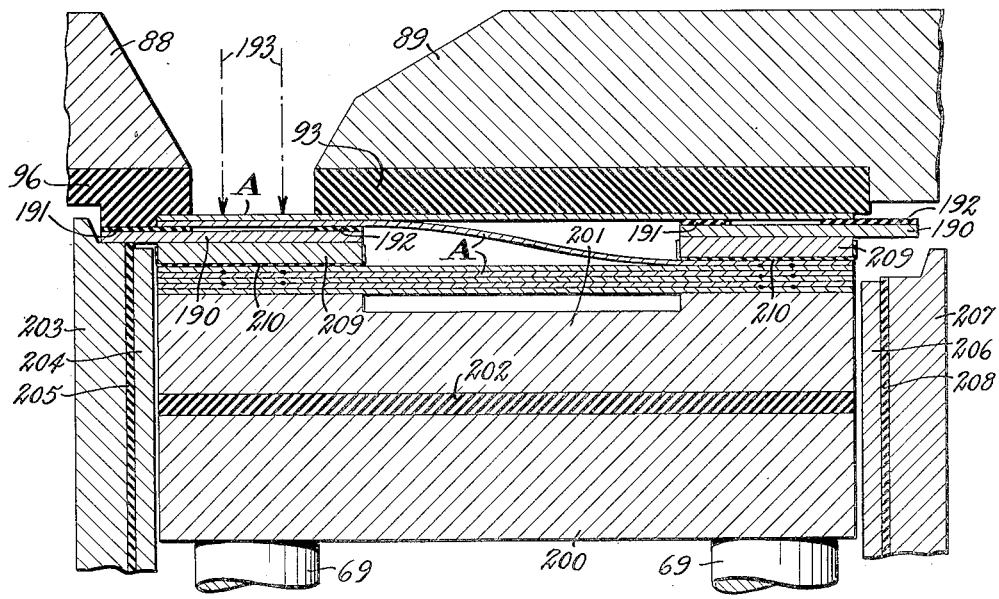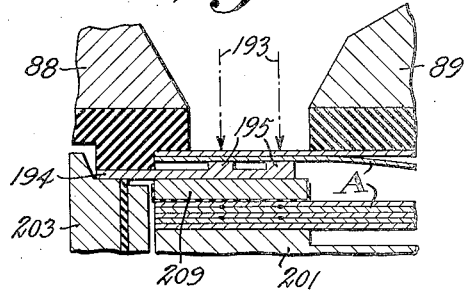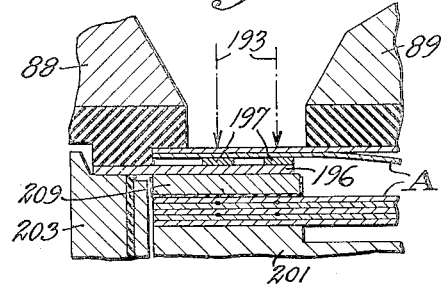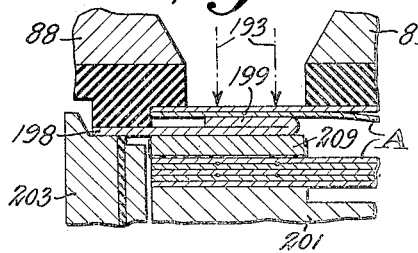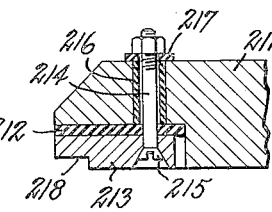

April 20, 1937.　　H. C. LOCKWOOD　　2,078,006
APPARATUS FOR WELDING
Filed Nov. 20, 1934　　9 Sheets-Sheet 9

INVENTOR
HENRY C. LOCKWOOD
BY
ATTORNEY

Patented Apr. 20, 1937

2,078,006

UNITED STATES PATENT OFFICE 2,078,006

APPARATUS FOR WELDING

Henry C. Lockwood, Brooklyn, N. Y.

Application November 20, 1934, Serial No. 753,849

26 Claims. (Cl. 219—4)

This invention relates to welding and more particularly pertains to electric resistance welding methods and apparatus.

Heretofore, resistance welding has been effected by two methods, viz, intermittent electrode contact with the work and continuous electrode contact. With both of these methods, the required welding heat has been generated by the application of alternating current either intermittently or of materially varying means effective value.

The employment of the first of these methods to produce line or seam welds, that is, intermittent electrode contact with the work, produces a sequence of overlapping spot welds by progressing the work step-by-step between welding periods, while one or both electrodes are out of contact with the work and the welding current is disconnected. This method may produce a good discontinuous mechanical union between the welded parts, but it cannot produce a continuous seam joint which is capable of withstanding substantial pressure without leakage for the reason, among others, that the weld is not formed with a continuous heat and the overlapped welded spots have several times been brought successively to fusion condition and rigidity, which injures the metal and results in the production of relatively poor welds with burns and interstices. Moreover, this method is slow because of the mechanical movements required and the necessity for the interruption of the current between spot welds.

With the second of these methods, that is, continuous contact of the electrodes with the work, the mechanical and electrical contact between the electrodes and the work is established at the beginning of the welding operation and is maintained until the seam or line weld is completed. This method is generally carried out by the use of roller electrodes which roll in contact with the work. This method has never produced a satisfactory seam weld without interrupting the application of current to the work or by what amounts to the same thing in less degree, materially varying the mean effective value of the current so as to provide necessary cooling intervals to prevent the work from becoming overheated. By interrupting or materially varying or modulating the current, mechanical unions have been obtained which will withstand without leakage only nominal pressure, such as is encountered in commercial liquid containers, for the reason that the seam produced by the practice of this method is in all essentials the same as that produced by intermittent electrode contact, and is not a true, continuously formed seam but is merely a series of overlapped spot welds. The interrupters employed with this method are basically, either mechanical or electrical. The first are not satisfactory because they require continuous maintenance and replacement of their electric contacts and are slow and retard production. The best of the electrical interrupters are electronic in action and while generally satisfactory for the function they perform, are expensive and limited in speed and capacity. Current interruption necessitates unnecessarily large capacity welding equipment and increases apparatus cost.

Accordingly, all prior methods of resistance seam welding employ a series of overlapping spot welds, each spot being successively heated, fused, cooled and frozen independently after the last spot has been completed and before the next spot is started. These methods result in discontinuous, uncertain welds.

The present invention provides a method and apparatus for producing pressure tight, continuous seam welds with continuous contact of the electrodes with the work and with continuous application to the work of electric current of substantially constant mean effective value during the production of the entire weld. With this method, overlapping spot welds are not produced and current interrupters are not required. A uniform, continuously laid down seam weld is achieved in one continuous heat, with no "in between" freezing periods and without danger of interstices. The fusion of welding runs along continuously without any interruption or change of intensity. The practice of my novel method has made possible a speed of production of satisfactory seam welds which is materially greater than is possible with prior seam welding methods and with a machine capacity requirement and a power consumption materially less than with prior methods, with apparatus which is materially less expensive in both initial cost and maintenance. My method makes it possible to successfully seam weld by electric resistance methods, metal of greater thicknesses than has been possible heretofore. The principles of my welding method and apparatus are also applicable to spot welding as will hereinafter appear.

With electric resistance welding, an electrical condition which is ordinarily termed a "short circuit" must be dealt with because the resistances, ohmic and reactive, making up the secondary or welding circuit are of such a low order of magnitude. Tremendous electric currents and heat generation must therefore be dealt with. Due principally to surface irregularities of the work, work thickness, and heterogeneity of work structure, the electrical resistance of the work included between the electrodes varies from point to point and these variations in resistance determine the points of least resistance which will have "current flow" preference and be brought to fusion condition and welded or burned. Microscopic differences in physical conditions of work and electrodes are therefore controlling with respect to electric current flow density and heat generation density. Points of lowest work resistance, due to variations in work thickness and of work structure, cause current and heat concentrations. High points due to surface irregularities of work and/or electrodes decrease contact area and also cause current and heat concentrations. For these reasons, if welding wheel electrodes of the prior art with their required comparatively broad contact faces are employed in an attempt to effect a seam weld with electric current of substantially constant mean effective value being continuously applied to the work, a continuous seam is not produced, but the result is merely a plurality of independent faulty spot welds disposed haphazardly over the area of the work with which the wheel electrodes have come in contact. Also heat concentrations will have occurred and arcs will have been drawn at various points, and at these points the work will be pitted and burned. In cases where such faulty welding and burning are not of great importance, this weld may effect a fair mechanical union of the welded parts, but it clearly will not produce a seam capable of withstanding any substantial pressure. In spot welding, as soon as the current is applied after the electrodes have been brought into contact with the work and pressure has been imposed, the work will be brought to plastic fusing condition first at the point of least resistance in the work volume disposed between the electrodes, ordinarily one or more high spots in this area, but due to the pressure exerted by the electrodes, after the first point has become plastic, the weld area flattens and other spots of least resistance are traversed by the current and brought to plastic fusion condition until the current is broken and the plastic fused metal "freezes" to complete the weld. If irregularities in work and electrodes, as above set forth, are not too great, and heat dissipation is adequate, a successful spot weld will result. The "stitch" seam welds of the prior art, being nothing more than a series of overlapping spot welds, are formed in the same manner. Localized haphazard welds and heat concentrations occur, but these are usually covered by the larger welded areas which are necessary to overlap each other and fill in the blank spaces between current applications. However, to avoid burning the work, the weld must be formed with a series of independent power surges or "shots" of very short duration, to bring each stitch or spot to fusion condition without permitting these spots to become too large and thus absorb too much heat for safe dissipation. In other words, the rate of thermal conduction through, and absorption by, the metal of the work surrounding the weld area must be exceeded sufficiently by the rate at which the desired volume of work metal to be welded is brought to fusing temperature in order to prevent the heat generated by the resistance to the passage of the welding current from spreading beyond the desired bounds and increasing necessary heat dissipation beyond that which is possible under the conditions obtaining. To effect this approximate "instantaneity" of heating, relatively heavy current must be applied for a very short time to produce each stitch or spot. In prior art "stitch" or seam welding, accordingly, either current interruption or what amounts to the same thing in lesser degree, periodic material reduction of current value has been necessary because spot welding with its "power off" or "power reduced" periods for heat dissipation has been required. This follows from the fact that the wheel electrodes of the prior art have necessarily initially possessed relatively wide work contacting surfaces which become even wider as a result of deformation. With such wheel electrodes, therefore, great power is required to heat quickly to fusing condition the relatively large metal mass between the wheel electrodes. Accordingly sound seam welds have not been produced heretofore by a continuous application of current of substantially constant mean effective value to the work because sufficient electrical power cannot be supplied with prior art equipment to heat the work fast enough to produce a satisfactory weld without ruining the work by burning, since the available resources for heat dissipation are not sufficient to retain the work within the bounds of the necessary temperature gradients and prevent burns and other weld faults.

It is for this reason, i. e., lack of adequate heat dissipation, that current interruption or periodic material reduction of current value with its inbetween dead or materially lessened power periods had to be resorted to with prior welding methods. Another great difficulty caused by inadequate heat dissipation and which has made current interruption or periodic material reduction necessary is the adhesion of melted particles of the work to the electrodes. These work particles freeze and leave the work attached to and imbedded in the electrodes and cause arcs, burning and pitting of the work.

In accordance with the present invention, a true continuous and substantially unvarying seam weld is produced by a continuous application of electric current of substantially constant mean effective value which generates heat continuously during the formation of the entire seam without any burning or pitting of the work. Very thin stainless steel sheets containing eighteen percent of chromium and eight percent nickel, which probably represents the most difficult seam welding problem have been seam welded successfully by my method. These seam welds have been tested in vessels arranged to impose an hydraulic pressure of 2500 lbs. per sq. in. on seams made in 0.018 in. thick stainless steel sheets and the seams withstood this pressure without any leakage whatsoever.

To produce seam or spot welds in accordance with my invention, I minimize the heat energy introduced into the work for the formation of the weld desired to the point, or beyond, where said heat energy input may be adequately dissipated without injury to work or weld or electrodes. This is accomplished by minimizing the mass or volume of the work through which the welding current is passed, thereby minimizing the mass of metal which must be brought to fusion temperature to form the weld. This may be done without adversely affecting the welds, because the strength of the parent metal is far exceeded by the strength of the narrowest seam weld it is possible to produce. Simultaneously with the heating of the work, I provide adequate pressure thereon to eliminate so far as possible any surface irregularities; to bring the electrodes and all parts of the work between the electrodes into the best possible physical and electrical contact and to effect the welded union of the parts of the work after having been heated to fusion temperature.

By minimizing the mass or volume of the work through which the welding current is passed, I avoid the objectionable effects of surface irregularities of the work and the electrodes. To accomplish this, I supply the electric current to the work through electrodes, one or both of which has or have electrical work engagement upon an area such that the continuously applied electric current of substantially constant mean effective value, in its passage through the work, is confined substantially to that volume wherein the heat generated in the work is sufficient for the formation of the weld desired and is no greater than can be dissipated without injury to the work or the electrodes. The current in passing through the work is thereby restricted substantially to the desired narrow line of weld in seam welding and to the desired minimum volume in spot welding and flows through all points of the desired area of weld with substantially equal current density throughout the area. By minimizing the heat energy input to the work, I reduce the quantity of heat which must be dissipated. Under some circumstances, satisfactory welds can be produced by a heat energy input so small that no additional means are required for heat dissipation other than the usual mass cooling and air absorption. Under other circumstances, it may be necessary to use other heat dissipating means such as water. With a small heat input, the high fusion temperature is confined to the inner surfaces of the work sheets where they contact each other at the weld point and the exterior surfaces of the work sheets do not become molten. For this reason, particles of the work do not adhere to the electrodes and arcing and burning of the work do not occur.

In the drawings, I have illustrated preferred forms of apparatus by means of which my novel welding method may be practiced. The apparatus disclosed is novel and is particularly adapted to the production of bellows of my invention, but it is not, in its entirety, limited thereto. It will be understood that the methods are not limited in their application to the production of bellows but are capable of wide application. My novel bellows is disclosed and claimed in my co-pending application Serial No. 736,396, filed July 21, 1934.

Referring to the drawings:

Fig. 4 is a sectional view taken on line 4—4 of Fig. 2;

Fig. 5 is a sectional view taken on line 5—5 of Fig. 2;

Fig. 6 is a vertical sectional view taken on line 6—6 of Fig. 2;

Fig. 7 is a vertical sectional view, on an enlarged scale, of the work holding mechanism and electrodes, shown in Fig. 2;

Fig. 8 is a view similar to Fig. 7 showing the mechanism arranged for an outside weld;

Fig. 9 is a transverse sectional view taken on line 9—9 of Fig. 7;

Fig. 10 is a sectional view of one form of upper electrode and controlling mechanism which may be employed, together with a wiring diagram for the apparatus shown;

Fig. 11 is a partial sectional view of another form of electrode;

Fig. 12 is a view similar to Fig. 11 showing a further form of electrode;

Fig. 14 is a perspective view illustrating one method by which a hard metallic plate for backing up the copper welding gaskets may be removed from the bellows after the completion of a weld;

Fig. 15 is a sectional view taken on line 15—15 of Fig. 14;

Fig. 16 is a sectional view, similar to Fig. 8, but on a larger scale, showing another form of welding gasket and also showing the use of insulation for the work holder and associated mechanism;

Figure 21:
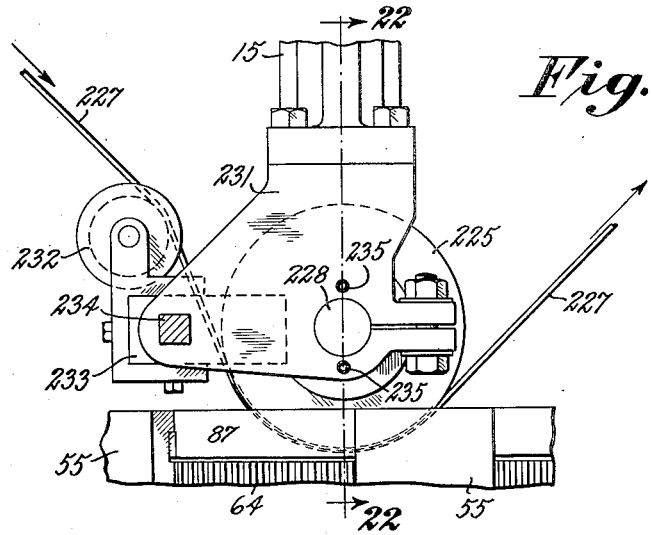
Figures 22, 23:
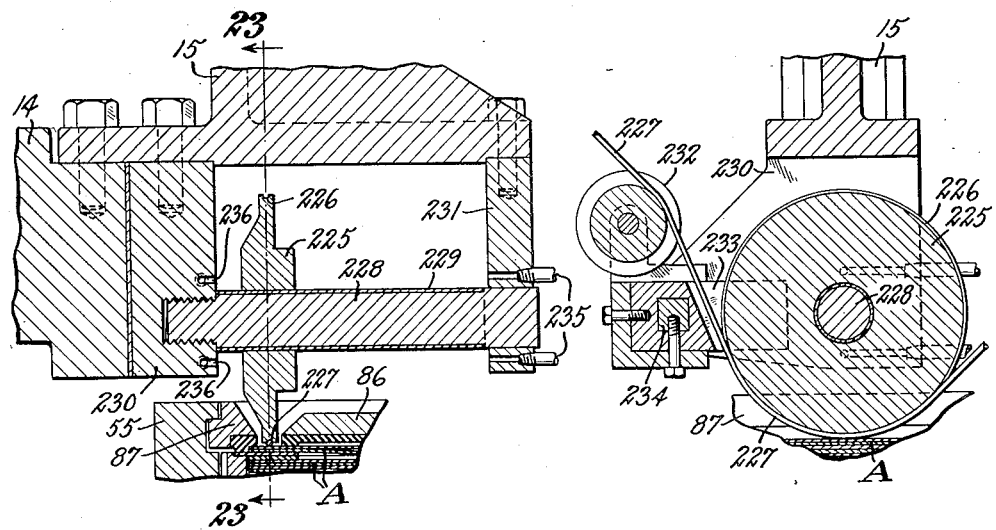

Figs. 17, 18, and 19 are views similar to Fig. 16 showing other forms of welding gaskets;

Fig. 20 is a partial sectional view showing another form of insulated hold-down plate;

Fig. 21 is a partial elevational view of another form of electrode which is effective in the practice of my invention;

Fig. 22 is a sectional view taken on line 22—22 of Fig. 21; and

Fig. 23 is a sectional view taken on line 23—23 of Fig. 22.

Like characters of reference refer to the same or similar parts throughout the several views.

Broadly, the machine disclosed herein includes work holding mechanism to adequately support the work during the welding operation, including the necessary electrical contacts; electrodes and electrical circuits for supplying the welding current to the work; mechanism to provide relative movement between the electrodes and work to effect seam welds; mechanism for adequately operating these instrumentalities, and a framework for supporting all in suitable operative relationship.

Figure 1:
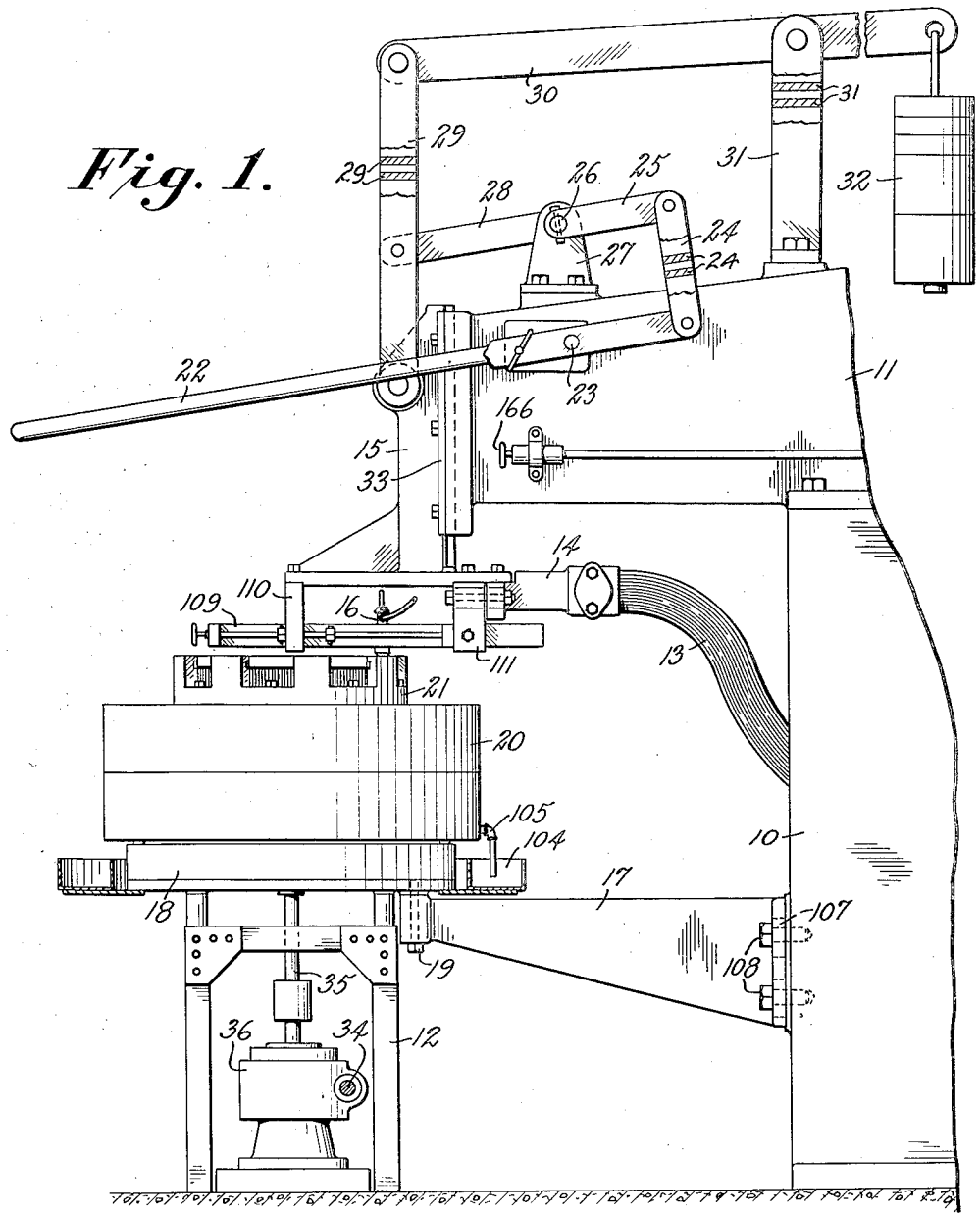
Fig. 1 is an elevational view, with parts broken away, of a welding machine for carrying out my welding method in the production of bellows of my invention.

Referring to Fig. 1 of the drawings, the framework of the machine includes a vertically disposed column 10 having a stationary head 11 secured to the upper portion thereof and work holder supporting framework 12.

The welding current is supplied to the work through a secondary circuit which includes a laminated copper conductor 13 connected at one end through a copper terminal block 14 to the vertically reciprocable head 15 of the machine which carries the upper electrode 16, and at the other end to a conducting arm 17 which extends from the column 10 to the stationary table 18. Arm 17 is insulated from column 10 and is in electrical contact with table 18, being secured thereto by bolts 19.

In the embodiment shown, the work is moved relative to the upper electrode 16 during the formation of the welds, and to this end a rotatable turntable 20 is provided which is supported on the stationary table 18. The work holder, or jig 21, is supported on, and is secured to, the turntable 20 and rotates under the upper electrode 16. The electrode 16 is reciprocated vertically by manually operated means including a hand operating lever 22 pivoted at 23 to the head 11. Lever 22 is pivoted at its rear end to two spaced links 24, one on each side of rod 23, both of which are pivoted to a lever 25, the latter being rigidly secured to one end of a rod 26 which is rotatably mounted in lugs 27 on head 11. A lever 28 fixed to the opposite end of rod 26 is pivotally connected to an intermediate point of spaced arms 29, the lower ends of which are pivotally connected to the upper portion of the reciprocable head 15. The upper ends of arms 29 are pivoted to one end of a lever 30 which is pivotally mounted between spaced supports 31 on head 11, and to the other end of which is hung a counterweight 32. Head 15 reciprocates in guides 33 on the front end of head 11.

Figure 2:
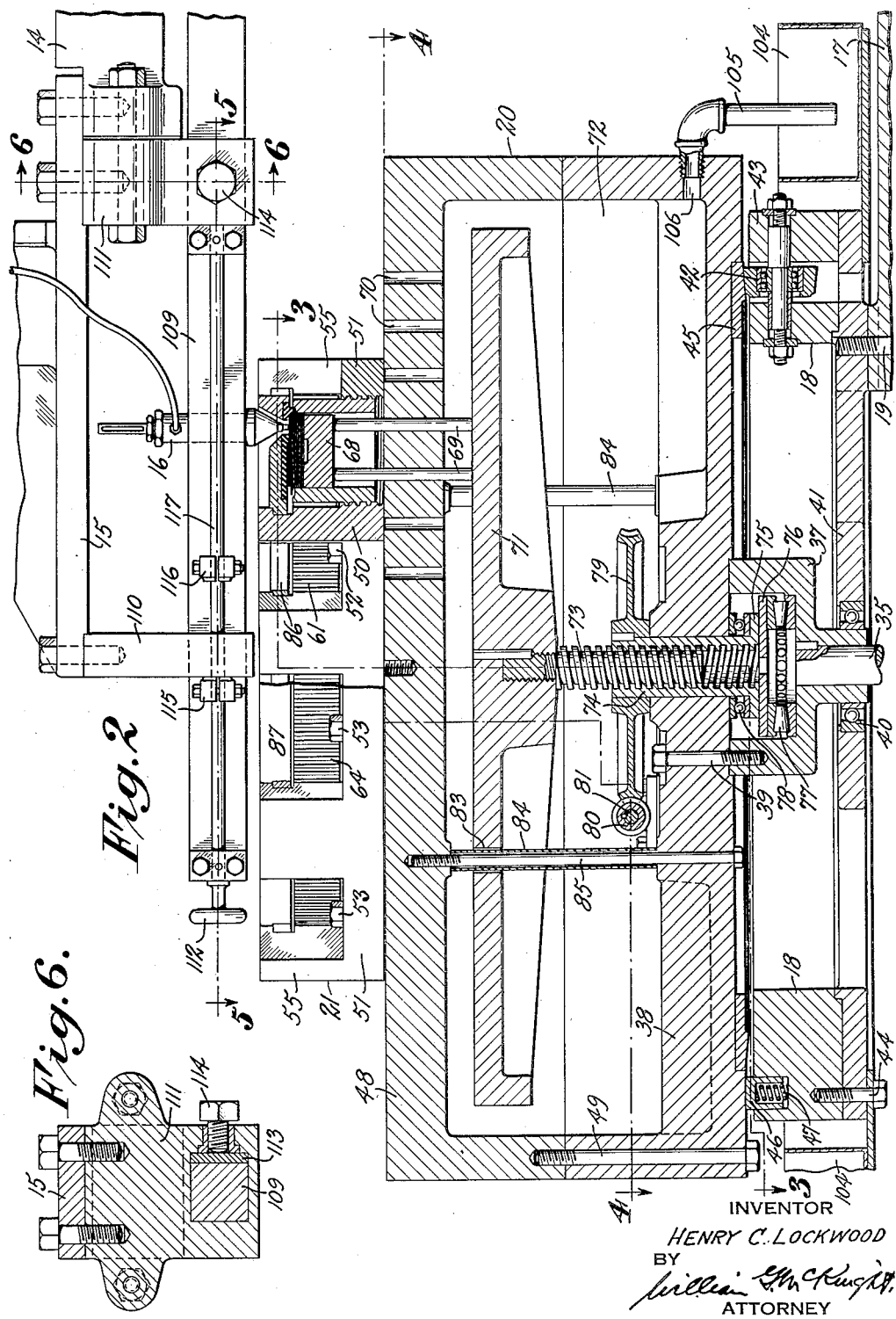
Fig. 2 is an enlarged vertical sectional view, with parts in elevation, of part of the machine shown in Fig. 1.

Turntable 20 is rotated by any suitable power means, adaptable to furnish a series of variable constant speeds, which rotates a shaft 34 geared to vertical shaft 35 through worm gear speed reducing mechanism 36. A thrust bearing housing 37, Fig. 2, is keyed to the upper end of shaft 35 and the lower plate 38 of the turntable is secured to housing 37 by bolts 39. Turntable 20 has a centralizing bearing 40 in plate 41 of stationary table 18 surrounding the lower end of housing 37. The turntable is supported on a plurality of roller bearings 42, Figs. 2 and 3, which are supported in an annulus 43 which forms part of the stationary table 18 and which is secured to the plate 41 thereof by bolts 44. A hardened steel annular roller race 45, secured to the lower surface of plate 38 of turntable 20, provides the surface which contacts with the rollers 42. Electrical connection between table 18 and turntable 20 is provided by a plurality of copper brushes 46, mounted in recesses disposed adjacent the periphery of annulus 43 of table 18. Each of these brushes is pressed into contact with plate 38 by a coil spring 47. Upper plate 48 of turntable 20, like the lower plate 38, is cup-shaped, and is secured in inverted position to the lower plate by bolts 49.

Figures 3, 13:
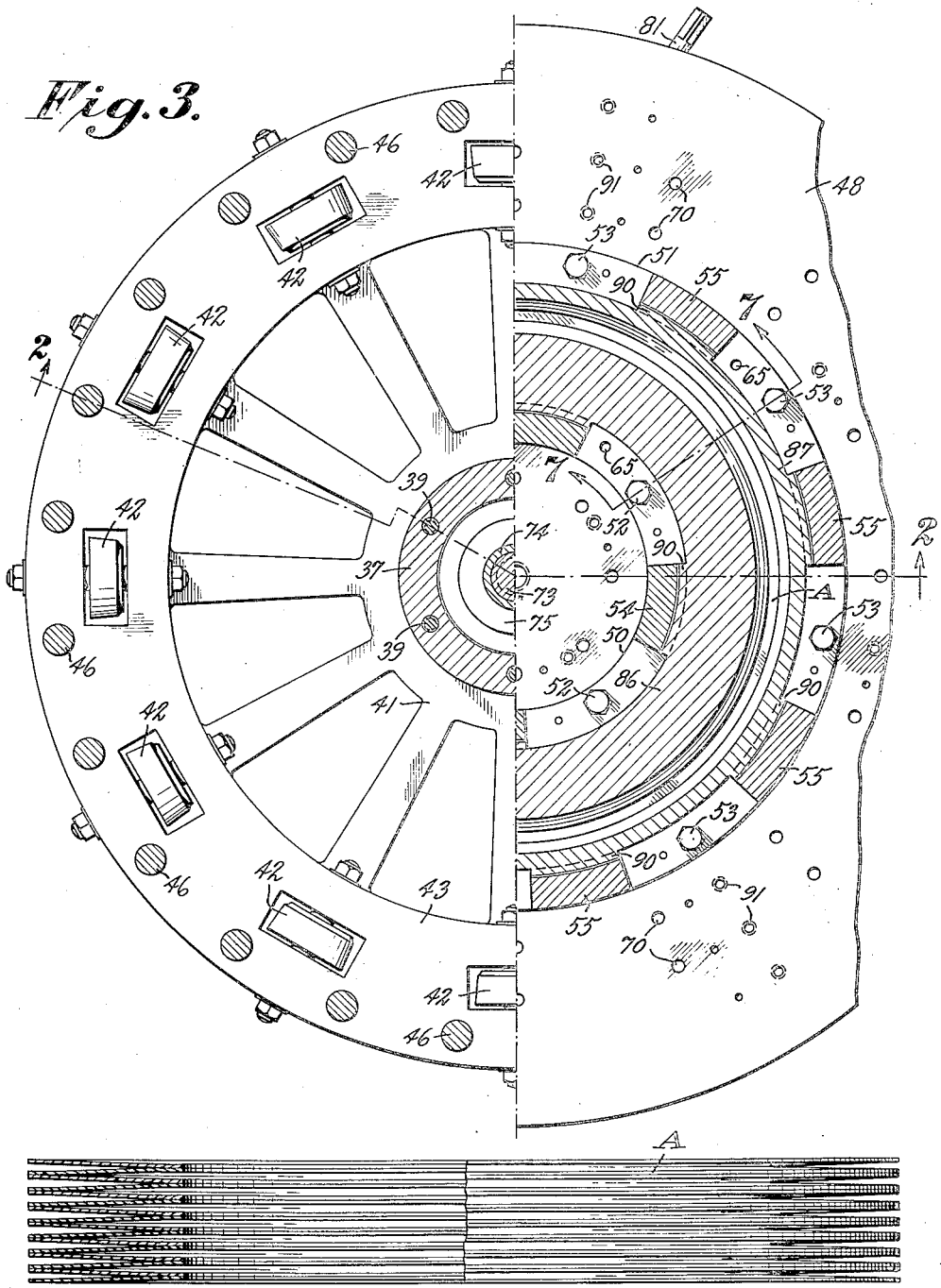
Fig. 3 is a transverse sectional view taken on line 3—3 of Fig. 2.
Fig. 13 is an elevational view, partly in section, showing a bellows of my invention which may be produced on the machine disclosed herein and by the practice of my welding method.

The machine disclosed is designed to produce bellows of the type shown in Fig. 13 and which consist of steel plates each seam welded adjacent their outer peripheries to an adjacent plate on one side and adjacent their inner peripheries to the adjacent plate on the other side. For this purpose, the work holder or jig 21 is arranged to secure rigidly the plates being welded and to provide good electrical contact between the plates and the jig, as well as to accommodate that part of the bellows which has already been welded.

Referring to Figs. 2, 3, 7, and 8, the jig includes independent inner and outer breach lock rings 50 and 51 respectively, which are secured by bolts 52 and 53 respectively, to the plate 48 of turntable 20. The rings 50 and 51 are provided with a plurality of spaced upstanding projections 54 and 55 respectively, each of which has a horizontally extending slot 56 adjacent the upper end thereof. The outer circumferential surface of ring 50 is provided with threads 57 and the inner circumferential surface of ring 51 is provided with threads 58. An inner contact ring 59 having threads 60 on the lower portion of its inner circumferential surface and vertically extending teeth 61 on the upper portion, is threaded on threads 57 of ring 50. An outer contact ring 62 provided with threads 63 on the lower portion of its outer circumferential surface and spaced vertically extending teeth 64 on the upper portion, is threaded on the threads 58 of ring 51. Rings 50 and 51 are provided with a socket 65 which receives the lower end of a removable tool 66 having a pinion 67 secured to its lower end which meshes with teeth 61 and 64 of the contact rings 59 and 62 to rotate and thereby raise and lower these rings. The plates A to be welded, as well as the plates A already welded, are supported on an annular internal backing-up plate 68 which is supported by a plurality of pairs of pressure posts 69 which extend through apertures 70 in plate 48 of the turntable and rest on an annular pressure plate 71 disposed in the space 72 between the upper and lower plates 38 and 48 of turntable 20. Pressure plate 71 is keyed to the upper end of a jack screw 73 which is threaded in a sleeve 74 having a laterally extending flange 75 at its lower end which rests on a base plate 76 and which in turn is supported by a roller bearing 77 supported on the thrust bearing housing 37. A ball thrust bearing 78 is interposed between the upper surface of flange 75 of sleeve 74 and the lower surface of plate 38 of turntable 20. Sleeve 74 is keyed to a worm wheel 79 which meshes with a worm 80 keyed to the intermediate portion of a shaft 81, Fig. 4, supported in suitable bearings on plate 38 of the turntable. The ends of shaft 81 are squared to receive cranks 82 for manually operating the shaft 81 and to thereby raise and lower pressure plate 71 and the backing-up plate 68. Pressure plate 71 has a plurality of apertures 83 which receive distance pieces in the form of sleeves 84 through which pass bolts 85 which aid in securing together the plates 38 and 48 of the turntable and prevent the rotation of the pressure plate 71 while it is being raised or lowered.

In making seam welds B adjacent the outer peripheries of the plates A, an inner hold-down plate 86, Fig. 7, and an outer hold-down plate 87, are employed. For welds C adjacent the inner peripheries of the plates A, an inner hold-down plate 88, Fig. 8, and an outer hold-down plate 89, are utilized. Each hold-down plate 86, 87, 88, and 89 is provided with a plurality of spaced, laterally extending locking lugs 90, which are proportioned to interfit with the slots 56 in the projections 54 and 55 on the breach lock rings 50 and 51. The hold-down plates are placed in position for the welding operation by registering the lugs 90 with the spaces intermediate the projections 54 and 55, moving the plates downwardly until the lugs 90 are in horizontal alignment with the slots 56 and then rotating the plates about their vertical axes until the lugs are in vertical alignment with the slots and the projections 54 and 55. Plate 86 is of sufficient radial width to extend from projections 54 on ring 50 to a point just short of the desired line of outer weld B, while plate 87 extends from the projections 55 on ring 51 to a point just short of the weld line B. The distance the plates 86 and 87 are spaced apart in a radial direction should be sufficient to provide ample space for the access of the lower end of the upper electrode 16 to the plates to be welded. To this end, plates 86 and 87 have their outer and inner circumferential surfaces bevelled, as shown in Fig. 7. The same remarks apply to plates 88 and 89 except that these plates are utilized for an inner weld C. Plate 88 is like plate 87 and plate 89 is like plate 86, except that they are reversed. All the hold-down plates are provided with insulating inserts in their lower portions which extend from the peripheries which are disposed adjacent the lines of weld to points just short of the locking lugs 90. These insulating inserts may be of bakelite or any other suitable insulating material. The inserts 92 and 93 of plates 86 and 89 respectively have a relatively narrow annular projection 94 which engages the upper plate A being welded, adjacent the line of weld. Each of the inserts 95 and 96 respectively of plates 87 and 88, has a projection 97 which engages the outer and inner peripheral portions respectively of outer and inner copper welding gaskets 99 and 98, these gaskets being disposed below the two plates A being welded. Lugs 97 are spaced from the inner and outer peripheries of the plates 87 and 88 respectively, thereby providing notches which receive the outer and inner peripheral edges respectively of the plates A being welded. The outer and inner peripheral portions respectively, of the upper surfaces of the contact rings 59 and 62 are provided with a notch 100 to receive the inner and outer peripheral portions respectively, of the welding gaskets 98 and 99. Inner and outer steel insert rings 101 and 102 respectively are placed below the copper welding gaskets 98 and 99 to provide a hard, smooth, practically unyielding surface to support the soft copper welding gaskets and thereby improve the character of the seam weld obtained, as will hereinafter appear. These rings may be of the character shown in Fig. 14. The backing-up plate 68 is provided with an annular recess 103 which is centrally disposed with respect to the upper surface of the plate 68.

The work-holder or jig 21 and all its parts are proportioned to effect the welding of bellows plates of a certain diameter and radial depth. To weld plates of other dimensions, complete jigs of commensurate dimensions are utilized. To this end the turntable is made of sufficient diameter to accommodate the largest diameter jigs it may be desired to employ and the apertures 70 and the holes 91 for bolts 52 and 53 are arranged, as shown for example in Figs. 3 and 4, to accommodate backing-up plates 68 with their pressure posts 69 and breach lock rings 50 and 51 of various diameters. In this way, the machine is readily adapted to weld bellows plates of all desired sizes within reasonable limits.

In circumstances where it is necessary or desirable to use water for heat dissipation, table 18 is provided with a drain pan 104 around its periphery which is adapted to receive water from a drain pipe 105 having its upper end threaded into an aperture 106 in the lower part of plate 38 of the turntable. Water sprayed or flowed on the work which runs into the turntable is thereby drained off and discharged into pan 104 from which it may be transferred to any point desired. Conducting arm 17 is provided with elongated bolt holes 107 for the securing bolts 108 to permit the arm to be raised and lowered as desired.

The upper electrode 16 is secured in a copper supporting arm 109 which is slidably mounted in spaced supports 110 and 111 which are secured to the lower end of the vertically reciprocating head 15. Arm 109 is of square cross-section and is provided at its front end with an operating knob 112. Sufficient frictional resistance is provided to maintain the arm 109 in any adjusted position by means of a steel wear plate 113 interposed between one side of arm 109 and the support 111. The pressure exerted on the plate 113 and on the arm 109 may be adjusted by screw 114 threaded into the side of support 111. Adjustably positioned stops 115 and 116 are carried by a rod 117 which is secured to one side of the arm 109. These stops are adjusted in position on the rod 117 and limit the lineal movement of the electrode 16 by cooperation with the support 110 against which they abut. In this way, the electrode may be readily positioned for the inner and outer welds for bellows plates of various dimensions.

Referring particularly to Fig. 10, the upper electrode 16 illustrates one means which is effective for practicing my novel welding method. The electrode includes a cylindrical member 120 having an enlarged head 121 in the form of an inverted cone, over the lowermost end of which is snugly fitted a thin cupshaped steel insulating member 122, the outside surface of which is coated with hard enamel. A dowel screw 123 retains the electrode in the supporting arm 109. The lower portion of the member 120 is provided with a relatively small diameter axial bore which receives, in relatively tight sliding fit relationship, a small diameter copper wire 124, the lower end of which projects through an aperture in member 122 which registers with the axial bore, and is adapted to contact with the work in sliding engagement along the desired line of weld. A copper rod of approximately 0.095 inch in diameter is satisfactory for this purpose but I do not wish to be limited to any particular size of rod or cross-sectional configuration thereof. The upper portion of the member 120 is provided with a relatively large axial bore 125 which connects with the upper end of the aforementioned small bore, and which is lined with a thin steel wear sleeve 126. Bore 125 provides a cylinder in which moves a pneumatically actuated piston 127 mounted on the intermediate portion of a small steel rod 128 which will slide in the small bore with its lower end in engagement with the upper end of the copper wire 124. Piston 127 carries a stop sleeve 129 to limit the upward movement of the piston. This sleeve engages a plug 130 which closes the upper end of bore 125. Plug 130 has an axial aperture 131 through which projects the upper end of steel rod 128 which functions as an indicator for the length of copper wire 124 remaining in the electrode 16. A glass tube 132 encloses the upper end of the rod 128 and this tube is retained in position by plug 133 and packing 134, the former being threaded into the plug 130. A metal guard 135 having opposed slots 136 to provide visibility, is disposed over the glass tube 132 and has it lower end threaded into plug 133. A gasket 137 disposed between the upper end of member 120 and the plug 130 prevents leakage from the bore 125. Piston 127 is located on rod 128 in such position that with the piston in its uppermost position, the lower end of rod 128 will be in the upper end of the bore carrying copper wire 124 and the piston will be positioned just below the air inlet 138 in the upper end of the bore 125.

An automatically operated air and exhaust valve 140 is employed to control the pressure exerted by the piston and steel rod 128 on the upper end of the copper welding rod 124. Valve 140 is fixed in some convenient position on the frame of the welding machine and includes a small cylinder 141 and a larger cylinder 142 connected together and having their outer ends closed by plugs 143 and 144 respectively. Air is introduced to cylinder 141 through a line 145 and inlet port 146 disposed in the central portion of the cylinder. A combined outlet and inlet port 147 is located above the inlet port 146 and is connected to inlet 138 of the bore 125 by a flexible tube 148. Exhaust port 149 is provided in the upper end of the small cylinder 141. A metallic plunger 150 has three plunger heads 151, 152, and 153 respectively, which are spaced from each other by rods 154 and 155 respectively, and moves in the cylinder 141, with the upper end of the plunger projecting into the lower end of the cylinder 142 to form a core for a solenoid 156. The plunger heads 151, 152 and 153 and the ports 146, 147 and 149 are so spaced and related that when the plunger is in its lowermost position with the lower end of head 151 resting on the plug 143, as shown in Fig. 10, head 152 closes inlet port 146 with its upper end lying just below port 147, while the lower end of head 153 lies just above the exhaust port 149 with ports 147 and 149 in communication, so that when the plunger is raised sufficiently, ports 146 and 147 will be in communication while port 149 will be closed. The upper end of plunger 150 extends about half way up in the axial opening 157 of the solenoid 156 disposed in the bottom of cylinder 142. A non-magnetic pusher piece 158 has a portion which extends into the opening 157 and into engagement with the upper end of plunger 150, and is provided with a head 159 which has a sliding fit with the cylinder 142. A coil compression spring 160 is interposed between pusher piece 158 and the plug 144 to urge the plunger 150 in a downward direction, so that normally the parts of the valve are in the position shown in Fig. 10 with the solenoid deenergized. A vent 91 is provided for the lower end of bore 125, and extends through the cylindrical portion 120 of the electrode and through the supporting bar 109. Solenoid 156 is connected in a control circuit 161 having a three pole magnetic switch 162, the switch points being designated 163, 164 and 165 respectively. Circuit 161 is the control circuit and is controlled by a switch 166 which may be manually operated as shown (see also Fig. 1), or may be arranged for automatic operation to be closed when the upper electrode 16 engages the work and to be opened when the electrode is withdrawn from contact therewith. The switch points 164 and 165 operate jointly and are connected in the welding circuit designated 167. This circuit includes a first auto transformer indicated 168 which is well known in the art, and needs no specific description, and a second auto transformer 169, similar to the first, the secondary of which is the single loop of laminated copper heretofore designated 13. One end 170 of the single loop 13 is connected to the copper supporting arm 109 in which the electrode 16 is secured in good electrical contact, and the other end 171 of the loop 13 is connected to the welding gasket 99 to complete the circuit for the welding current through the work.

The operation of the machine herein disclosed for practicing my novel method is as follows: Having selected the proper size of parts for the work-holder or jig 21 which are appropriate for the size of bellows plates A to be welded, the inner and outer breach lock rings 50 and 51 are first securely bolted in position on the upper plate 48 of the turntable 20, both rings being positioned so as to be concentrically disposed with respect to the turntable. Inner and outer contact rings 59 and 62 are next threaded on the rings 50 and 51 respectively, and are turned down preferably, to approximately their lowermost position in contact with the top of turntable 20. The proper size of backing-up plate 68 is then selected and placed upon the pressure posts 69 thereunder, which have been inserted through the apertures 70 in turntable 20 which are disposed in the annular space intermediate the rings 50 and 51. The sliding head 15 which carries the upper electrode 16, previously has been moved upwardly so that it does not interfere with the positioning of the jig and its several parts. Also the pressure plate 71 previously has been lowered by the operation of crank 82 so that the upper surface of the backing-up plate 68 is sufficiently low to accommodate the plates A previously welded and the plates A being welded, below the lower surfaces of the hold-down plates. For simplicity, and convenience in describing the welding operation, it will be assumed that no heavy end or terminal plates are to be welded to the outside plates of the bellows prior to the fabrication thereof from the plurality of identical ring-like plates A. It will also be assumed that several plates A have previously been properly seam-welded together to form that part of the bellows which is supported on the backing-up plate 68 and below the plates A being welded, as shown in Figs. 7 and 8, for example.

Assuming that an outer weld B is the first of the succeeding welds to be made, particular reference is made to Figs. 2 and 7, wherein the several parts of the machine are shown in their proper relationship for effecting an outer weld. Previous to the welding together of plates $A^1$ and $A^2$ adjacent their inner peripheries at C, and before plate $A^2$ was placed in position for welding to the plate $A^1$, a hardened steel insert ring 102 having an outside diameter approximately equal to the outside diameter of the plates A was placed on top of plate $A^1$ and a copper welding gasket 99 having an inside diameter approximately equal to that of the insert ring 102 and an outside diameter sufficiently great to extend beyond the insert ring 102 and well into engagement with the upper surface of the contact ring 62, was placed on top of the ring 102. Plate $A^2$ was thereafter positioned on top of plate $A^1$ and welding gasket 99 and the plates $A^1$ and $A^2$ were then welded at C. After plates $A^1$ and $A^2$ were welded at C, preparation should be made for the next succeeding inner seam weld. Assuming that the hold-down plates have been removed, and the contact rings are in lowered position, an inner hardened steel insert ring 101 is placed in position on top of the inner peripheral portion of plate $A^1$. Next an inner copper welding gasket 98 is placed on the ring 101, concentrically therewith, and with its inner peripheral portion extending over the upper surface of the contact ring 59. This completes the preparation for the next succeeding inner weld. Following this, bellows plate $A^3$ is placed in position so that the outer peripheral portion of plate $A^3$ is in contact with the outer peripheral portion of plate $A^2$ and the inner peripheral portion of plate $A^3$ is in contact with the welding gasket 98. The inner and outer hold-down plates 86 and 87 are now placed in position with the locking lugs 90 in vertical alignment with the slots 56 in the upstanding projections 54 and 55. Thereafter, crank 82 is rotated in the proper direction to raise pressure plate 71 in the turntable 20 so that the backing-up plate 68 will be moved upwardly until the plate $A^3$ has been brought into firm engagement with the outer and inner peripheral portions of the hold-down plates 86 and 87 respectively. Next the removable tool 66 is employed to rotate contact ring 62 to move the ring upwardly as seen in Fig. 7, until the welding gasket 99 has been firmly clamped between the backing-up plate 87 and the upper surface of the contact ring 62, thereby to provide good electrical contact between the welding gasket and the contact ring. In making the outer weld it is unnecessary to raise the inner contact ring 59 into engagement with the welding gasket 98 but this ring should be raised to such an extent that its upper surface is either flush with or above the upper surface of the lower of the two bellows plates being welded, so as to provide a centering surface for the bellows plates, if needed.

With the upper electrode 16 in the proper position with respect to the sliding head 15 to make an outer weld B, head 15 is lowered by means of the operating lever 22 until the lower end of electrode 16 is in contact with bellows plate $A^3$. The position of the various parts of the machine will now be as shown in Figs. 1, 2, and 7 of the drawings. In this position, the secondary welding circuit is completed from the lower end of copper rod 124 in electrode 16 through the two bellows plates $A^2$ and $A^3$, through welding gasket 99, contact ring 62, breach lock ring 51, turntable 20, brushes 46, annulus 43, plate 41, and conducting arm 17 to laminated conductor 13. The motor which drives shaft 34 is then started and the turntable 20 brought up to the proper constant speed necessary to provide the welding speed desired for the diameter of the weld being formed. Turntable 20 is thus caused to rotate and carry with it the workholder 21 and the plates A to be welded. The control circuit 161 is then closed by the operator, by pressing the control switch 166 which operates the magnetic switch 162 thereby closing the welding circuit 167 and energizing solenoid 156 in valve 149. The energization of the solenoid 140 causes plunger 150 to move upwardly against the action of spring 160 to such an extent that ports 146 and 147 of valve 40 are brought into communication with each other. Line 145 having previously been connected with a suitable source of air pressure, air under pressure is conducted into port 147 through pipe 148 and into the upper end of bore 125 in the electrode 16 through port 139. This pressure will be exerted on the upper end of piston 127 and will be communicated through steel rod 128 to the copper welding rod 124. The pressure so exerted on the copper rod 124 need only be sufficient to provide good electrical contact between the lower end of the copper rod and the upper surface of plate $A^3$. The heavy pressure necessary to provide good surface flatness and parallelism between the plates $A^2$ and $A^3$ in the area surrounding the line of weld by removing or ironing out sufficiently the surface irregularities of these plates in this area and also to provide the pressure required for joining the two pieces of work metal at the weld after they have been brought to fusing temperature, is supplied through the cylindrical part 120 of the electrode 16 which acts through the non-conducting tip 122 on the lower end of the electrode. In the embodiment shown, this pressure is exerted by the operator through operating lever 122 but it will be understood that automatic means may be utilized for this purpose, if desired. This rotation of the work under the electrode 16 with the welding current being continuously applied to the work while the work is moved under the electrode, results in the formation of a true, continuous seam weld which unites the bellows plates to form a high pressure leak-proof joint. If necessary or desirable during the formation of the seam weld, cold water may be flowed or sprayed by any suitable means, onto the lower end of the electrode 16 and into the trough formed between the hold-down plates 86 and 87 so that the plates being welded are submerged in water during welding. In other words, cold water in sufficient quantity may be supplied to the work in the area being welded so that the weld will be formed under water and the heat generated by the passage of the welding current will be dissipated.

After the turntable has made a complete revolution, and a little more to insure overlapping, and a continuous seam weld has been produced, the operator opens control switch 166 which causes automatic switch 162 to open switch points 164 and 165, thereby breaking the welding circuit and cutting off the supply of welding current to the electrode. At the same time, switch 163 is broken by the action of the automatic switch 162 and solenoid 156 in valve 140 is deenergized thereby permitting the pressure exerted by spring 160 to move plunger 150 downwardly to its lowermost position which closes port 146, thereby cutting off the air pressure from the piston 127 and placing ports 147 and 149 into communication with each other. The air pressure in bore 125 is thereby released through port 149 and the pressure exerted by rod 128 on the copper welding rod 124 is relieved. The operator then moves operating lever 22 upwardly thereby moving the sliding head 15 upwardly and withdrawing electrode 16 from contact with the plate $A^3$. The motor driving turntable 20 is then stopped. Tool 66 is then employed to lower the contact ring 62 from engagement with the welding gasket 99, after which crank 82 is rotated to lower the backing-up plate 68 to an extent sufficient to relieve the pressure on the hold-down plates 86 and 87 which may then be removed from the breach lock rings 50 and 51. The bellows assembly is then removed from work-holder 21.

Thereafter, the welding gasket 99 is moved laterally in its own plane until a portion of its inner periphery is entirely clear of the outer periphery of the plates $A^2$ and $A^3$. The welding gasket is then cut across from outside to inside in one place by a knife or shears in an approximate radial direction after which the gasket may be spiraled out and withdrawn from between the bellows plates. The removal of the soft copper gaskets and the grooves produced therein during welding render them impractical for further use, so that it is desirable to use a new one for each weld. They are inexpensive however and have a scrap value.

Since the annular insert tool steel ring 101 is of hardened steel and is disposed between bellows plates $A^1$ and $A^2$ which have been welded together adjacent their outer peripheries, a special tool 175 shown in Figs. 14 and 15 is provided to assist in removing the insert ring so that it may be used again for subsequent seam welds. The hardened steel insert ring 101 is discontinuous, being cut across radially in one place, and is provided with a plurality of spaced apertures 176 on a line adjacent its outer periphery as shown in Fig. 14 so that the apertures will not be positioned below the desired line of weld. After the removal of copper welding gasket 99, as just described, hardened ring 101 is moved laterally in its own plane until the abutting ends 177 and 178 have been moved just beyond the outer peripheries of the bellows plates $A^1$ and $A^2$. Tool 175 which comprises a handle having a cylindrical portion 179 on one end thereof which carries relatively small cylindrical, axially disposed projections 180 extending from the ends of the portion 179 and which are of such proportions as to fit slidably in the apertures 176, is utilized to assist in removing the hardened ring 101 from between the plates $A^1$ and $A^2$ in the manner illustrated in Fig. 14. One of the projections 180 is first inserted in the aperture 176 nearest the end 177, for example, and after this end has been sprung up over the plates $A^1$ and $A^2$, a projection of the tool is successively inserted in the other apertures to bring successive portions of the insert above the plates until the entire ring has been spiraled out. Although the manner of removing the hardened rings 101 and 102 has been illustrated in connection with the removal of a ring utilized for an outside weld, it will be understood that the inside weld insert ring may be removed in the same manner, the only difference being that the outside edge of the ring is sprung up over the inside edges of the plates A. These hardened insert rings are removed readily and often can be spiraled out with the fingers without resorting to a tool. Being hardened, they take no impression and may be used over and over indefinitely.

The bellows assembly is then replaced in work-holder 21.

To make the next succeeding inner weld C, that is, to weld the inner peripheral portion of plate $A^3$ to the inner peripheral portion of the next adjacent plate $A^4$, Fig. 8, and to provide for the outer weld B next to be made, an outer steel insert ring 102 is placed on the plate $A^3$ and an outer copper welding gasket 99 is placed on ring 102 in the position shown in Fig. 8. After this, the next bellows plate $A^4$ is placed in position above the welding gasket 99 and the backing-up plate 68 is lowered until the uppermost bellows plate $A^4$ thereon is somewhat below the lower edge of slots 56 in projections 54 and 55. It will be remembered that prior to the welding of plates $A^2$ and $A^3$, inner insert ring 101 and inner welding gasket 98 were placed in the position shown in Fig. 7. The hold-down plates 88 and 89 are then placed in operative position with the lugs 90 in alignment with the slots 56, after which backing-up plate 68 is raised until the uppermost plate $A^4$ and welding gasket 98 are in firm engagement with the hold-down plates. Next tool 66 is employed to rotate contact sleeve 59 until it is raised into firm contact with welding gasket 98 to complete the welding circuit between the gasket and the ring 50 which is secured in good electrical contact with plate 48 of turntable 20. Operating lever 22 is then moved to lower electrode 16 into contact with the work after the electrode has been moved by sliding supporting arm 109 to such a position that the electrode is in proper position to make the inner weld C. At this point the several parts of the jig and electrode are in the positions shown in Fig. 8. The driving motor is then started and the turntable 20 brought up to the desired constant speed. While maintaining sufficient pressure on operating lever 22, the operator closes control switch 166 and turntable 20 is rotated a little more than a complete revolution carrying the jig with it to complete the inner weld.

Thereafter, control switch 166 is opened, the driving motor is stopped, lever 22 is moved upwardly to withdraw the electrode from contact with the work, contact plate 59 is lowered, backing-up plate 68 is slightly lowered to relieve the pressure on the hold-down plates, the latter are removed and the bellows assembly withdrawn from workholder 21. Gasket 98 and insert ring 101 are then removed in the manner heretofore described for the removal of gasket 99 and insert ring 102.

After the welding gasket 98 and the insert ring 101 have been removed and the bellows assembly returned to work-holder 21, an insert 101 for the next inside weld C is placed over the uppermost plate $A^4$ and an inside welding gasket 98 is positioned over the insert 101, after which the next plate A to form the next leaf of the bellows is placed in position. The jig parts are then assembled and properly positioned as has been previously described and the electrode 16 is moved into position to make the next outer weld B as heretofore set forth. In this manner, as many bellows plates as desired may be seam welded to form bellows of desired dimensions. It will be observed that the apparatus disclosed provides for the accommodation of that part of the bellows which has already been fabricated, in the wall space made available by the downward movement of the backing-up plate 68.

Satisfactory pressure-tight, continuous seam welds are produced in accordance with my novel welding method by utilizing the welding electrode 16 illustrated in Fig. 10 when employed in connection with the means heretofore disclosed for completing the secondary welding circuit through the work to be welded. With this equipment, true pressure-tight, continuous seam welds are produced by a continuous application of heat generated by the resistance of the work to the passage of continuously applied electric current of substantially constant mean effective value for the duration of the entire length of the seam weld to be made. These seam welds are produced without any pitting or burning of the work and without producing any other harmful effects thereon.

With an electrode of the type illustrated in Fig. 10, it will be apparent that by utilizing an electrode rod 124 of very small diameter, the electrical contact area between the electrode rod and the work is very small and the consequent passage of the welding current through the work is confined to a very narrow line of weld in seam welding. Microscopic irregularities of work surface which may remain notwithstanding the "ironing out" pressure applied to the work by the non-conducting tip 122 of the electrode and any other irregularities are greatly minimized in the weld area by the narrowness thereof. It is thus apparent that by the arrangement of at least one of the electrodes so that a small area of electrical contact with the work is provided, as by utilizing a copper rod of small cross-sectional area with its axis normal to the plane of the work, there will be no possibility of haphazard, hit and miss, discontinuous spotting in the weld since the work is in contact only with the relatively very small area of the lower end of the copper rod. With a narrow weld, far less power is required since less metal has to be heated. Since all welding heat must be dissipated, this means that much less heat has to be disposed of with a narrow weld. This prevents pitting and burning and provides a uniform, perfect seam weld. Adequate pressure to bring the two plates or other parts being welded into good mechanical and electrical contact along the line of weld is provided by the operator exerting sufficient pressure on the operating lever 22. This pressure is transmitted to the work through the non-conducting tip 122 of the lower end of the electrode. As previously mentioned, it will be understood that any pressure exerted on the operating lever 22 is not transmitted to the copper welding rod 124. The pressure on the copper rod is supplied entirely by pneumatic pressure which acts on piston 127 and as heretofore mentioned, this pressure need be sufficient only to maintain the lower end of the copper rod 124 in good electrical contact with the work. It will be seen therefore, that with the welding apparatus heretofore disclosed, complete independence of action is maintained between the (1) heavy pressure transmitted to the work to provide good mechanical and electrical contact between the parts being welded by ironing out the surface irregularities so far as possible and to provide the pressure to squeeze the two work pieces into a weld after they are raised to fusing temperature at the weld point, and the (2) light pressure transmitted to the copper rod which conducts the welding current to and from the work. In other words, I have provided an electrode for electric resistance welding having completely independent operating parts, one of which functions solely as an electrical conductor to conduct welding current to and from the work which only requires light pressure, and the other of which supplies the necessary forging pressure along the desired line of weld which requires heavy pressure. This construction places the heavy pressure necessary upon a strong member which carries no current and which will stand up indefinitely.

The heat generated in the electrodes and the work due to the resistance to the passage of the welding current may be dissipated by the use of water as heretofore described, if desired. An inspection of Fig. 10 will show that with the exception of that part which extends through the non-conducting tip 122, the copper rod 124 is entirely surrounded by relatively large volumes of copper which form the lower end of the electrode 16. In consequence, the welding current is maintained at relatively low density until it reaches the tip 122 where it is then concentrated into the lower end of the small copper rod prior to its passage through the work. Since the tip 122 is made of relatively thin metal which is coated with hard enamel or other non-conducting material, the path through which the highest density current flows is reduced to a minimum, and as a result, the heat generated in the electrode 16 is maintained at a relatively very low, safe point and will be readily absorbed and dissipated. This avoids any deformation of the copper rod 124. With this arrangement, it will also be perceived that during the formation of the seam welds the lower end of electrode 16 and the lower end of copper rod 124 are maintained in sliding contact with the work, in consequence of which there is provided a continuously renewed and self cleaning current carrying work contacting surface which aids in the formation of a satisfactory seam weld. It will also be seen that the small copper rod 124 is supported throughout its entire length thereby avoiding mechanical deformation of the rod due to any pressure which may be transmitted to it. The pressure of the non-conductor tip on the work prevents the lower end of the rod from mushrooming out between the non-conducting tip and the work surface.

It is also apparent that the non-conductor tip furnishing pressure to the work, completely surrounds and is immediately adjacent to, the welding rod 124, which is thus acting in the center of the pressure area, which "irons out" the work surface and closes the weld. This also assists heat dissipation.

In lieu of utilizing a non-conducting tip 122 which is fitted over the lower end of the electrode 16, a small thin ferrule 185, Fig. 11, of steel or other suitable metal having its lower work contacting end covered with a suitable hard non-conducting material, such as baked porcelain enamel for example, may be employed. If desired, the ferrule may be made entirely of non-conducting material which will withstand the pressure to be transmitted to the work through the ferrule.

As shown in Fig. 12, a copper rod 186 having a tip 187 of tungsten or other suitable high melting point and abrasion resistant metal, may be employed in the electrode 16 in place of the copper rod 124.

Also, if desired, a short rod or wire consisting entirely of tungsten or other high melting point and abrasion resistant metal may be employed in lieu of the copper rod 124 or the tungsten tipped copper rod 186 shown in Fig. 12.

With electrodes of the type shown in Fig. 10, constant electrical contacting area between the electrode and the work is at all times maintained, since the small wire 124 is of practically uniform cross-sectional area throughout its length and is always restricted to this area at its work contacting end by the other parts of the electrode. The greater pressure imposed during welding on the other parts of the electrode, contributes to this result. This is important where the same conditions are maintained throughout the welding operation because if greater electrical contact area occurs, the unit heat supplied to the work will be insufficient to produce good welds, and if smaller electrical contact area occurs, the unit heat supplied will be greater and the resulting heat concentration will ruin the work.

The electrode shown in Fig. 10 may be utilized for spot welding. For this purpose, however, it is not essential that pneumatic or hydraulic pressure be applied to the small copper rod 124, but adequate pressure may be imposed by a coil spring or the like disposed in or on the electrode. The cooperating electrode may have a work engaging area approximately the same as that of the other electrode and preferably will be provided with a thin, relatively soft work engaging portion, to the work contacting surface of which there is imparted the properties of a smooth, relatively hard member which is interposed between the thin work engaging portion and the remainder of the electrode.

It will be understood that satisfactory seam welds may be made in accordance with my method and with the apparatus herein disclosed without utilizing the hardened steel insert rings 101 and 102 or their equivalent. When these insert rings are not employed in the manner heretofore described, the lower surface of the copper welding gaskets will rest on the bellows plates A. However, better results are obtained by utilizing a perfectly smooth, flat, hard backing-up surface such as provided by the insert rings to support the relatively thin soft copper welding gaskets thereby to avoid any tendency to cause burning and pitting or, on the other hand, non-welding of the work during welding which may occur repeatedly as a result of the separate or cumulative effect produced by reason of all the inner and outer welds respectively being made in alignment.

As above noted, in welding bellows without hardened insert rings, the soft copper welding gasket being used for the next weld lies directly upon and is backed up by the last weld. The copper welding gasket being soft and the welds in line, any irregularities in the previous weld upon which the gasket directly rests will be transmitted to the gasket. When a good normal weld is made, there is usually a slight concavity or groove across the weld area section. When the next corresponding weld is made, the soft copper gasket deforms into the groove and the next weld is apt to have a slightly deeper groove. Thus, when one weld is made over another in alignment therewith, as in the fabrication of bellows as herein disclosed, this weld groove is accentuated as successive welds are made. As these weld grooves accumulate depth, the backing up of the work at the weld point becomes "softer" and the weld accordingly weaker. Finally, strips will occur on the weld line, here and there, where no weld has taken place. When slight localized depressions occur in the previous weld, just the opposite occurs. Such slight depressions in the next previous weld which is disposed immediately under the copper welding gasket, provide recesses into which the copper gasket, when portions thereof become plastic or molten, flow, thereby lowering the upper surface of the gasket and drawing an arc which usually burns a hole through both pieces of work. When overheating occurs with an electrode of the wheel or roller type, small molten particles of the work freeze and adhere to the wheel, leaving the work on the wheel as the wheel rolls off the work. These adhering particles draw an arc as they leave the work surface and cause pits and burns. In the case of the electrodes herein disclosed, the electrode rod never leaves the work surface during the weld formation and, further, is completely surrounded by the pressure producing non-conducting tip. These dangers therefore cannot exist with the electrode herein disclosed. The use of the inserts 101 and 102 or their equivalent completely eliminates these disadvantageous effects resulting from the use of a soft metal electrode. The use of the hardened metal inserts makes it possible to obtain perfect seam welds regardless of any roughness in the surface beneath the welding gasket and also regardless of the softness of the welding gasket. It will be understood that this principle of using a smooth, hard, surface which resists deformation, to support a soft metal electrode is not limited in its application to the welding of bellows, but may be applied generally to seam and spot welding.

To concentrate further the passage of the welding current through the work in the desired line of weld, over that degree of concentration which is obtained by the apparatus heretofore disclosed, other forms of welding gaskets may be employed, such as those shown in Figs. 16 to 19 inclusive. In Fig. 16, the welding gaskets consist of continuous copper rings 190 having continuous thin paper rings 191 and 192 secured by suitable heat resisting cement to the inner and outer peripheral portions respectively of the upper surface of the gaskets. The space between these paper rings on the upper surface of the gaskets 190 is preferably co-extensive with the space between the hold-down plates 88 and 89. By using gaskets of this character, the plates A to be welded are normally maintained in spaced relationship to the gaskets 190 and are brought into contact with the upper surface of the gaskets only by the pressure exerted on the plates A by the electrode, such as the electrode 16. Other suitable insulating materials, such as paint may be employed, in lieu of paper. In this way, only the area of the lower surface of the bottom plate A being welded which is adjacent that portion of the plates being welded, is brought into contact with the welding gaskets. This limits the area of the work through which the welding current may flow in passing between the electrodes and results in a somewhat better current concentration in the lower of the two plates A. In Figs. 16 to 19 inclusive, two concentric circular welds, indicated by the arrows 193, are made.

In Fig. 17, no insulation is used on the welding gaskets, but the gasket itself is formed to effect the same result. The gasket 194 is provided with two spaced, annular, concentric ridges 195 integral with the gasket and extending from the upper surface of the gasket in the areas desired for the lines of welds. In Fig. 18, the gasket 196 is similar to the gasket 194 except that the ridges 197 are made separately in the form of continuous rings and are secured in the desired positions on the upper surface of the gasket by any suitable means. Satisfactory results may be obtained by the use of the form of gasket 198 shown in Fig. 19. This gasket which is an inner gasket or one used in the production of an inner weld consists of a continuous copper ring having its outer peripheral portion 199 folded over into contact with the upper surface of the gasket. The folded over portion 199 should be of sufficient extent to extend beyond the lines of weld as indicated in Fig. 19. Forms of welding gaskets, other than those disclosed, may be utilized if desired. It will be understood that the forms of gaskets disclosed are for illustrative purposes and the invention in this aspect is not limited thereto.

In Fig. 16 there are disclosed other forms of inner and outer contact rings for the work holder or jig 21, and another form of backing-up plate. These forms are constructed and arranged to insulate completely these parts from the other parts of the jig and the machine as a whole. The form of backing-up plate illustrated in this figure consists of a lower continuous steel ring 200 which is supported by the pressure posts 69, and an upper continuous steel ring 201 which is spaced from the lower ring 200 by a continuous ring of bakelite or other suitable insulating material 202. With this arrangement, the upper part of the backing-up plate is completely insulated from the pressure posts and the other parts of the machine which come in contact with the pressure posts. The inner contact ring consists of two continuous steel rings 203 and 204 which are spaced by a relatively thin layer of bakelite or other suitable insulating material 205. The outer contact ring is of similar construction, consisting of inner and outer steel rings 206 and 207 respectively, which are spaced by a layer of bakelite or other insulating material 208. It will be noted that the copper welding gaskets 190 have electrical contact with the rings 203 and 207 and do not engage the rings 204 and 206. In addition, the steel insert rings designated 209 in Fig. 16, are insulated from the plates A which have been welded and from the contact rings by having a thin layer of insulating material 210, such as paper or paint on their bottom and side surfaces. The use of the insulation at the points shown in Figs. 16 to 19 inclusive aids in confining the passage of the welding current through the parts through which it is desired the current shall pass and thereby reduces to some extent the power necessary to produce satisfactory welds.

I have found that continued use of the hold-down plates having bakelite inserts, such as heretofore disclosed, results at times in warping of the bakelite due to continued exposure to widely varying temperatures in consequence of which a desirably smooth and accurate surface is not presented to the bellows plates A which are engaged by the bakelite inserts during the welding operations. The bakelite also tends to wear. To overcome this disadvantage, hold-down plates constructed as shown in Fig. 20 may be employed. In this figure, there is shown a sectional view of the inner peripheral portion of an outer hold-down plate, such as plate 87 shown in Fig. 7. The hold-down plate comprises a suitably formed steel ring 211 having an annular recess in its inner and lower peripheral portion. A layer of bakelite or other suitable insulating material 212 is disposed on the upper horizontally extending surface of the recess and a hardened steel ring 213 is placed over the insulation 212 and is secured to the ring 211 by bolts and nuts generally designated 214. The heads 215 of the bolts are counter-sunk in the ring 213 as shown, and the bolts and nuts are insulated from ring 211 by insulating tubes 216 and insulating washers 217, respectively. Ring 213 is provided with an annular recess 218 in the inner peripheral portion of its lower surface, the surfaces of which are machined to receive the outer peripheral portions of the plates A to be welded. With this arrangement, the hold-down plates present a permanent smooth, hard metallic surface to the bellows plates which will not ordinarily be deformed or worn. It will be understood that the arrangement shown in Fig. 20 may be applied to the inner hold-down plates, such as plate 86 in Fig. 7.

In Figs. 21, 22, and 23, there is disclosed another form of electrode which may be employed to carry out my seam welding method. With this form, rolling contact with the work is provided and a new work engaging surface is continually furnished as the welding progresses. The electrode comprises a rotatable wheel 225 of copper or other suitable metal or material preferably but not necessarily having a peripheral groove 226 shaped and proportioned to receive a small diameter wire 227. I have found that a copper wire 0.095 inch in diameter will produce satisfactory seam welds, but wires of diameters or cross-sectional areas, different than this may be utilized, if desired. The wheel 225 and the wire 227 should be of such proportions as to provide a relatively small area of electrode contact with the work, preferably an electrical contact area such that the continuously applied current of substantially constant mean effective value, in passing through the work, is confined substantially to that volume wherein the heat generated in the work is sufficient for the formation of the weld desired and is no greater than can be dissipated without injury to the work or to the electrodes.

The wheel design preferably should be such that the surface contact between the wheel and wire is sufficient to permit the dissipation of the heat generated by the flow of current through the wire without injurious effects thereto. The ends of the wire 227 may be reeled and any suitable means may be employed to drive one or both reels and to provide the required tautness in the wire. The wheel 225, as shown, is revolubly and slidably mounted on a copper shaft 228 having a thin steel sleeve 229 thereon to provide resistance to wear. The shaft is carried by spaced supporting arms 230 and 231, both of which are secured to the head 15 of the machine. A guide wheel 232 may be provided for the wire 227 and this wheel may be mounted on a fork 233 fixed on a shaft 234 which is slidably mounted in the supports 230 and 231. The fork engages the sides of the wheel 225 to move it to the desired welding position on the shaft 228. If necessary or desirable for heat dissipation, water may be flowed onto the wheel 225 from the conduits 235 and 236. This wheel electrode may be employed for spot welding as well as for seam welding and may be utilized with another electrode of any satisfactory form, such as those herein disclosed.

Electrodes of the form shown in Fig. 10 and of the form shown in Figs. 21, 22, and 23 may be employed to produce satisfactory spot or seam welds by prior art methods, such as current interruption and periodic material reductions of current value.

Any other type of current, including direct and oscillating current, may be utilized as well as alternating current to produce satisfactory seam or spot welds in accordance with my invention. The methods and apparatus herein disclosed may be employed with any of these types of current. It is preferable that the mean effective value or the root mean square value of the current should be substantially constant in order to provide and maintain a substantially constant rate of heating of the work at the welding point or points.

The seam welding method herein disclosed may be employed in any and all instances where seam welding is desired and it is not limited to the welding of the bellows plates disclosed, nor is it limited to seam welding in a curved line. My method may be employed with the same effectiveness to produce straight line seam welds for any and all uses. Moreover, the use of my method is not limited to the production of pressure-tight joints but may be used wherever a mechanical union only is desired.

My method is independent of any specific form of apparatus, such as that which has been selected for disclosure herein. For welding other types of work, other appropriate work holding mechanism may be employed. In some instances, it will be desirable to maintain the work in a stationary position and to produce the seam weld by appropriately moving the electrodes relative to the work. The method may be carried out with forms of electrodes other than those disclosed herein. In lieu of the annular copper welding gaskets employed for the lower electrodes, an electrode the same as, or similar to the upper electrodes disclosed, may be used. One or more rollers of copper or other suitable metal may be employed for the lower electrode with an upper electrode the same as, or similar to, one of those disclosed herein. A straight, flat copper strip may be used for the lower electrode if straight seam welds are to be produced.

My welding method, in its essentials, is applicable to spot welding, as well as to seam welding. The method is particularly useful where spot welds are to be made in exact locations and are to be limited in size.

By using suitable metals, it may be desirable to transmit the entire welding pressure required through a current carrying part or parts which have electrical contact with the work. The upper electrode alone or both the upper and lower electrodes may have rolling contact with the work, rather than sliding contact, as disclosed. Suitable means such as a small diameter wire on a wheel may be used in lieu of the electrodes heretofore disclosed, to produce seam welds in accordance with my method.

Any operation or movement disclosed herein which is manually controlled may be made automatic without departing from the invention and any or all such movements or operations may be coordinated as desired. For example, a single push button or pedal control may be utilized which will control all the essential operations to produce a seam weld.

Since changes may be made in the form and arrangement of the several parts of the apparatus herein disclosed and variations may be effected in the several steps of the method disclosed without departing from the principles of the inventions, it will be understood that no intention is entertained to limit the inventions except by the scope of the appended claims.

What I claim is:

1. Apparatus for welding metal plates to form bellows which comprises means for supporting the plates to be welded together with any plates previously welded, an electrode disposed within the area of the bellows plates and intermediate adjacent plates in electrical contact with one of the plates, a second electrode in contact with another of the plates to be welded, means for supplying welding current to said electrodes, and means providing relative movement between the plates and one of the electrodes while maintaining electrical contact therebetween.

2. Apparatus for welding metal plates to form bellows which comprises means for supporting the plates to be welded together with any plates previously welded, means within the area of the bellows plates in electrical contact with one of said plates providing a welding electrode, means having a substantially smooth, relatively hard surface disposed with respect to said electrode so that the qualities of said surface are imparted to the work engaging surface of said electrode, a second electrode in contact with another of the plates to be welded, means for supplying welding current to said electrodes, and means providing relative movement between the plates and one of the electrodes while maintaining electrical contact therebetween.

3. Apparatus for welding metal plates to form bellows which comprises means for supporting the plates to be welded together with any plates previously welded, means within the area of the bellows plates and disposed between adjacent plates in electrical contact with one of said plates providing a welding electrode, means for clamping together all of said plates and said electrode, a second electrode in contact with another of the plates to be welded, means for supplying welding current to said electrodes, and means providing relative movement between the plates and one of the electrodes while maintaining electrical contact therebetween.

4. Apparatus for welding metal plates to form bellows which comprises means for supporting the plates to be welded together with any plates previously welded, means within the area of the bellows plates in electrical contact with one of said plates providing a welding electrode, means having a substantially smooth, relatively hard surface disposed with respect to said electrode so that the qualities of said surface are imparted to the work engaging surface of said electrode, means for clamping together all of said plates, a second electrode in contact with another of the plates to be welded, means for supplying welding current to said electrodes, and means providing relative movement between the plates and one of the electrodes while maintaining electrical contact therebetween.

5. Apparatus for welding metal plates to form bellows which comprises means for supporting the plates to be welded together with any plates previously welded, means comprising a strip of electrical conducting material within the area of the bellows plates in electrical contact with one of said plates providing a welding electrode, a second electrode in contact with another of the plates to be welded, means for supplying welding current to said electrodes, and means providing relative movement between the plates and one of the electrodes while maintaining electrical contact therebetween.

6. Apparatus for welding metal plates to form bellows which comprises means for supporting the plates to be welded together with any plates previously welded, means within the area of the bellows plates in electrical contact with one of said plates providing a welding electrode, said electrode having a portion extending beyond the area of the bellows plates, means for clamping together said plates and said electrode, means connected to a source of welding current and movable into and out of contact with said extending portion of the electrode, a second electrode in contact with another of the plates to be welded, means for supplying welding current to said electrodes, and means providing relative movement between the plates and one of the electrodes while maintaining electrical contact therebetween.

7. Apparatus for welding metal plates to form bellows which comprises means for supporting the plates to be welded together with any plates previously welded, means within the area of the bellows plates in electrical contact with one of said plates providing a welding electrode, means having a substantially smooth, relatively hard surface disposed with respect to said electrode so that the qualities of said surface are imparted to the work engaging surface of said electrode, said last mentioned means being disposed in welding position within the area of said bellows plates and being removable from welding position after the weld has been completed, a second electrode in contact with another of the plates to be welded, means for supplying welding current to said electrodes, and means providing relative movement between the plates and one of the electrodes while maintaining electrical contact therebetween.

8. Apparatus for welding metal plates to form bellows which comprises means for supporting the plates to be welded together with any plates previously welded, means within the area of the bellows plates in electrical contact with one of said plates providing a welding electrode, means for moving said plates and electrode as a unit against clamping means with sufficient force to clamp said unit between the supporting and clamping means, a second electrode in contact with another of the plates to be welded, means for supplying welding current to said electrodes, and means providing relative movement between the plates and one of the electrodes while maintaining electrical contact therebetween.

9. Apparatus for welding metal plates to form bellows which comprises means for supporting the plates to be welded together with any plates previously welded, means within the area of the bellows plates in electrical contact with one of said plates providing a welding electrode, said electrode having a portion extending beyond the area of the plates, means for moving said plates and electrode as a unit against clamping means with sufficient force to clamp said unit between the supporting and clamping means, a second electrode in contact with another of the plates to be welded, means for supplying welding current to said electrodes, and means providing relative movement between the plates and one of the electrodes while maintaining electrical contact therebetween.

10. Apparatus for welding annular metal plates to form bellows or the like comprising an annular support for the plates to be welded together with any plates previously welded, an electrode comprising an annular strip of electrical conducting material disposed within the area of the bellows plates and in electrical contact with one of the plates in the area thereof to be welded, clamping means, means for moving the support and said plates and electrode toward the clamping means until the plates and electrode are clamped between the support and clamping means, a second electrode in contact with another of the plates to be welded, means for supplying welding current to said electrodes, and means providing relative movement between the plates and one of the electrodes while maintaining electrical contact therebetween.

11. Apparatus for welding annular metal plates to form bellows or the like, comprising an annular support for the plates to be welded together with any plates previously welded, an electrode comprising an annular strip of electrical conducting material disposed within the area of the bellows plates and in electrical contact with one of the plates in the area thereof to be welded, an annular strip having a substantially smooth, relatively hard surface disposed with respect to said electrode so that the qualities of said surface are imparted to the work engaging surface of said electrode, clamping means, means for moving the support and said plates and electrode toward the clamping means until the plates and electrode are clamped between the support and clamping means, a second electrode in contact with another of the plates to be welded, means for supplying welding current to said electrodes, and means providing relative movement between the plates and one of the electrodes while maintaining electrical contact therebetween.

12. Apparatus for welding annular metal plates to form bellows or the like, comprising an annular support for the plates to be welded together with any plates previously welded, an electrode comprising an annular strip of electrical conducting material disposed within the area of the bellows plates and in electrical contact with one of the plates in the area thereof to be welded, an annular discontinuous strip having a substantially smooth, relatively hard surface disposed with respect to said electrode so that the qualities of said surface are imparted to the work engaging surface of said electrode, clamping means, means for moving the support and said plates and electrode toward the clamping means until the plates and electrode are clamped between the support and clamping means, a second electrode in contact with another of the plates to be welded, means for supplying welding current to said electrodes, and means providing relative movement between the plates and one of the electrodes while maintaining electrical contact therebetween.

13. Apparatus for welding annular metal plates to form bellows or the like, comprising an annular support for the plates to be welded together with any plates previously welded, an electrode comprising an annular strip of electrical conducting material disposed within the area of the bellows plates and in electrical contact with one of the plates in the area thereof to be welded, said electrode having a portion extending beyond the area of the plates, clamping means, means for moving the support and said plates and electrode toward the clamping means until the plates and electrode are clamped between the support and clamping means, means electrically connected to a source of welding current for electrically contacting the extending portion of said electrode, a second electrode in contact with another of the plates to be welded, means for supplying welding current to said electrodes, and means providing relative movement between the plates and one of the electrodes while maintaining electrical contact therebetween.

14. Apparatus for welding annular metal plates to form bellows or the like, comprising an annular support for the plates to be welded together with any plates previously welded, an electrode comprising an annular strip of electrical conducting material disposed within the area of the bellows plates and in electrical contact with one of the plates in the area thereof to be welded, said electrode having a portion extending beyond the area of the plates, clamping means, means for moving the support and said plates and electrode toward the clamping means until the plates and electrode are clamped between the support and clamping means, means electrically connected to a source of welding current for electrically contacting the extending portion of said electrode, said last mentioned means being movable into and out of electrical engagement with the extending portion of said electrode, a second electrode in contact with another of the plates to be welded, means for supplying welding current to said electrodes, and means providing relative movement between the plates and one of the electrodes while maintaining electrical contact therebetween.

15. Apparatus for welding annular metal plates to form bellows or the like, comprising an annular support for the plates to be welded together with any plates previously welded, an electrode comprising an annular strip of electrical conducting material disposed within the area of the bellows plates and in electrical contact with one of the plates in the area thereof to be welded, clamping means, means for moving the support and said plates and electrode toward the clamping means until the plates and electrode are clamped between the support and clamping means, said clamping means being arranged to electrically insulate said plates from the apparatus through the clamping means, a second electrode in contact with another of the plates to be welded, means for supplying welding current to said electrodes, and means providing relative movement between the plates and one of the electrodes while maintaining electrical contact therebetween.

16. Apparatus for welding annular metal plates to form bellows or the like, comprising an annular support for the plates to be welded together with any plates previously welded, an electrode comprising an annular strip of electrical conducting material disposed within the area of the bellows plates and in electrical contact with one of the plates in the area thereof to be welded, clamping means, means for moving the support and said plates and electrode toward the clamping means until the plates and electrode are clamped between the support and clamping means, said clamping means having electric insulating material for contacting said plates to electrically insulate the plates from said clamping means, a second electrode in contact with another of the plates to be welded, means for supplying welding current to said electrodes, and means providing relative movement between the plates and one of the electrodes while maintaining electrical contact therebetween.

17. Apparatus for welding annular metal plates to form bellows or the like, comprising an annular support for the plates to be welded together with any plates previously welded, an electrode comprising an annular strip of electrical conducting material disposed within the area of the bellows plates and in electrical contact with one of the plates in the area thereof to be welded, clamping means comprising spaced members, means for moving the support and said plates and electrode toward the clamping means until the plates and electrode are clamped between the support and clamping means, a second electrode in contact with another of the plates to be welded and having its plate engaging end disposed in the space between said clamping members, means for supplying welding current to said electrodes, and means providing relative movement between the plates and one of the electrodes while maintaining electrical contact therebetween.

18. Apparatus for welding annular metal plates to form bellows or the like, comprising a work holding member, an annular support for the plates to be welded together with any plates previously welded mounted on the work holding member, an electrode comprising an annular strip of electrical conducting material disposed within the area of the bellows plates and in electrical contact with one of the plates in the area thereof to be welded, clamping means on the work holding member, means for moving said support and said plates and electrode toward the clamping means until the plates and electrode are clamped between the support and clamping means, a second electrode in contact with another of the plates to be welded, means for supplying welding current to said electrodes, and means providing relative movement between the plates and one of the electrodes while maintaining electrical contact therebetween.

19. Apparatus for welding annular metal plates to form bellows or the like, comprising a work holding member, an annular support for the plates to be welded together with any plates previously welded mounted on the work holding member, an electrode comprising an annular strip of electrical conducting material disposed within the area of the bellows plates and in electrical contact with one of the plates in the area thereof to be welded, said electrode having a portion extending beyond the area of said plates, clamping means on the work holding member, means for moving said support and said plates and electrode toward the clamping means until the plates and electrode are clamped between the support and clamping means, means electrically connected to a source of welding current and mounted on the work holding member and movable into and out of electrical contact with the extending portion of said electrode, a second electrode in contact with another of the plates to be welded, means for supplying welding current to said electrodes, and means providing relative movement between the plates and one of the electrodes while maintaining electrical contact therebetween.

20. Apparatus for welding annular metal plates to form bellows or the like, comprising a work holding member, an annular support for the plates to be welded together with any plates previously welded mounted on the work holding member, an electrode comprising an annular strip of electrical conducting material disposed within the area of the bellows plates and in electrical contact with one of the plates in the area thereof to be welded, said electrode having a portion extending beyond the area of said plates, clamping means on the work holding member, means for moving said support and said plates and electrode toward the clamping means until the plates and electrode are clamped between the support and clamping means, means electrically connected to a source of welding current and mounted on the work holding member and movable into and out of electrical contact with the extending portion of said electrode, said clamping means being electrically insulated from the plates and said electrode, a second electrode in contact with another of the plates to be welded, means for supplying welding current to said electrodes, and means providing relative movement between the plates and one of the electrodes while maintaining electrical contact therebetween.

21. Apparatus for welding metal plates comprising a first electrode having a thin portion in contact with one of the plates in the area to be welded consisting of a relatively soft electrical conducting material, means having a smooth, relatively hard surface disposed with respect to said portion so that the qualities of said surface are imparted to the work engaging portion, and a second electrode for contacting another of the plates to be welded and electrically connected to the first electrode in a welding circuit.

22. Apparatus for welding relatively thin metal plates comprising a first electrode having a portion disposed in welding relationship to one of said plates in the area to be welded, and a second electrode for contacting another of the plates to be welded and electrically connected to the first electrode in a welding circuit, said first electrode having electric insulating material disposed between the electrode and the plate to which it is disposed in welding relationship but beyond the confines of the desired weld area to provide an insulating air space between said plate and the electrode in the desired area of weld, whereby upon welding engagement of the second electrode with the other plate, electrical contact will be effected between the first electrode and said one plate at the desired point of weld whereby the welding current will be concentrated to the desired weld point of said plates.

23. Apparatus for electric resistance seam welding comprising means including an electrode in engagement with the work to be welded for continuously applying an uninterrupted and unmodulated electric current of substantially constant mean effective value to the work during the formation of the weld, the electrode being constructed and arranged to confine the current, in its passage through the work, substantially to that volume of the work wherein the heat continuously generated by the current in the work is sufficient for the formation of the weld desired and is no greater than can be dissipated without injury to work or weld, the electrode having a flow path for electric current of highest density beyond the confines of the work so proportioned that the heat generated in said path may be dissipated without injurious effects to the means forming the path, to thereby provide a substantially constant and uninterrupted welding heat input to the work to produce a continuous and substantially unvarying seam weld.

24. Apparatus for welding relatively thin metal plates comprising a first electrode having a portion disposed in welding relationship to one of said plates in the area to be welded, and a second electrode for contacting another of the plates to be welded and electrically connected to the first electrode in a welding circuit, said first electrode being spaced from said one plate to provide an insulating air space between the electrode and said one plate in the desired weld area, whereby upon welding engagement of the second electrode with the other plate, electrical contact will be effected between the first electrode and said one plate at the desired point of weld whereby the welding current will be concentrated to the desired weld point of said plates.

25. Apparatus for welding metal plates comprising a first electrode having a thin portion in contact with one of the plates in the area to be welded consisting of a relatively soft electrical conducting material, means for imparting to the work contacting portion of the first electrode, the qualities of a good welding surface, and a second electrode for contacting another of the plates to be welded and electrically connected to the first electrode in a welding circuit.

26. Apparatus for welding metal plates to form bellows which comprises means for supporting the plates to be welded together with any plates previously welded, means within the area of the bellows plates in electrical contact with one of said plates providing a welding electrode, means for imparting to the work contacting portion of the first electrode, the qualities of a good welding surface, a second electrode in contact with another of the plates to be welded, means for supplying welding current to said electrodes, and means providing relative movement between the plates and one of the electrodes while maintaining electrical contact therebetween.

HENRY C. LOCKWOOD.